(12) United States Patent
Dowlatkhah et al.

(10) Patent No.: US 10,631,208 B2
(45) Date of Patent: *Apr. 21, 2020

(54) METHOD AND SYSTEM FOR MANAGING UTILIZATION OF SLICES IN A VIRTUAL NETWORK FUNCTION ENVIRONMENT

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,969

(22) Filed: Aug. 3, 2018

(65) Prior Publication Data

US 2019/0037446 A1 Jan. 31, 2019

Related U.S. Application Data

(63) Continuation of application No. 15/658,595, filed on Jul. 25, 2017, now Pat. No. 10,070,344.

(51) Int. Cl.
*H04W 28/02* (2009.01)
*H04L 12/717* (2013.01)
*H04W 28/16* (2009.01)

(52) U.S. Cl.
CPC ....... *H04W 28/16* (2013.01); *H04W 28/0289* (2013.01); *H04L 45/42* (2013.01)

(58) Field of Classification Search
None
See application file for complete search history.

(56) References Cited

U.S. PATENT DOCUMENTS 4,285,469 A 8/1981 Huang
5,671,253 A 9/1997 Stewart
(Continued)

FOREIGN PATENT DOCUMENTS

CN 102045896 A 5/2011
CN 105052074 2/2014
(Continued)

OTHER PUBLICATIONS

"Cell Site on Light Trucks", 2007, 1 page.
(Continued)

*Primary Examiner* — Ajit Patel
(74) *Attorney, Agent, or Firm* — Guntin & Gust, PLC; Ralph Trementozzi

(57) ABSTRACT

Aspects of the subject disclosure may include, for example, determining a first group of virtual network functions of a first network slice instantiated within a software defined network and adapted to perform a first activity that facilitates delivery of a service to wireless equipment of a first user. An occurrence of a condition is determined and in response, access is facilitated to a second group of virtual network functions of a second network slice. The second group of virtual network functions, when instantiated within the software defined, network are configured to deliver the service to the wireless equipment of the first user during the occurrence of the condition within the first network slice. The second network slice is further adapted to perform another activity that facilitates delivery of another service during an occurrence of another condition within another network slice. Other embodiments are disclosed.

20 Claims, 8 Drawing Sheets

(56) References Cited

U.S. PATENT DOCUMENTS

| | | |
|---|---|---|
| 5,970,408 A | 10/1999 | Carlsson et al. |
| 6,246,883 B1 | 6/2001 | Lee |
| 6,795,686 B2 | 9/2004 | Master et al. |
| 6,873,620 B1 | 3/2005 | Coveley et al. |
| 7,167,923 B2 | 1/2007 | Lo et al. |
| 7,206,294 B2 | 4/2007 | Garahi et al. |
| 7,486,678 B1 | 2/2009 | Devanagondi et al. |
| 7,532,640 B2 | 5/2009 | Kelly et al. |
| 7,660,583 B2 | 2/2010 | Pekonen et al. |
| 7,787,414 B2 | 8/2010 | Le Faucheur et al. |
| 8,145,208 B2 | 3/2012 | Chari et al. |
| 8,234,650 B1 | 7/2012 | Eppstein et al. |
| 8,385,977 B2 | 2/2013 | Fein et al. |
| 8,593,968 B2 | 11/2013 | Santiago et al. |
| 8,621,058 B2 | 12/2013 | Eswaran et al. |
| 8,676,219 B2 | 3/2014 | Lennvall et al. |
| 8,868,069 B2 | 10/2014 | Bennett et al. |
| 9,077,478 B1 | 7/2015 | Schmidtke et al. |
| 9,078,284 B2 | 7/2015 | Richardson |
| 9,119,016 B2 | 8/2015 | Durand et al. |
| 9,225,587 B2 | 12/2015 | Zhang et al. |
| 9,225,652 B2 | 12/2015 | Li et al. |
| 9,245,246 B2 | 1/2016 | Breitgand et al. |
| 9,270,815 B2 | 2/2016 | Shaw et al. |
| 9,298,515 B2 | 3/2016 | McMurry et al. |
| 9,301,333 B2 | 3/2016 | Choi et al. |
| 9,305,301 B2 | 4/2016 | Paul et al. |
| 9,306,909 B2 | 4/2016 | Koponen et al. |
| 9,311,108 B2 | 4/2016 | Cummings |
| 9,330,156 B2 | 5/2016 | Satapathy |
| 9,369,390 B2 | 6/2016 | Bantukul et al. |
| 9,378,043 B1 | 6/2016 | Chen et al. |
| 9,384,028 B1 | 7/2016 | Felstaine et al. |
| 9,391,897 B2 | 7/2016 | Sparks et al. |
| 9,392,471 B1 | 7/2016 | Thomas et al. |
| 9,401,962 B2 | 7/2016 | Parker et al. |
| 9,407,542 B2 | 8/2016 | Vasseur et al. |
| 9,436,443 B2 | 9/2016 | Chiosi et al. |
| 9,445,341 B2 | 9/2016 | Spinelli et al. |
| 9,450,823 B2 | 9/2016 | Rhee et al. |
| 9,461,729 B2 | 10/2016 | Djukic et al. |
| 9,497,572 B2 | 11/2016 | Britt et al. |
| 9,503,969 B1 | 11/2016 | Zakaria et al. |
| 9,544,120 B2 | 1/2017 | Scholten et al. |
| 9,553,806 B2 | 1/2017 | Anand |
| 9,559,980 B2 | 1/2017 | Li et al. |
| 9,565,074 B2 | 2/2017 | Lehane et al. |
| 9,602,422 B2 | 3/2017 | Padmanabhan et al. |
| 9,762,402 B2 | 9/2017 | Batz et al. |
| 9,907,113 B2 | 2/2018 | Cheng et al. |
| 10,193,984 B2 | 1/2019 | Haddad et al. |
| 2003/0123446 A1 | 7/2003 | Muirhead et al. |
| 2003/0145106 A1 | 7/2003 | Brown et al. |
| 2004/0103308 A1 | 5/2004 | Paller et al. |
| 2005/0003010 A1 | 1/2005 | Cohen et al. |
| 2006/0029097 A1 | 2/2006 | McGee et al. |
| 2007/0140269 A1 | 6/2007 | Donnelli et al. |
| 2008/0232272 A1 | 9/2008 | Gelbman et al. |
| 2008/0285492 A1 | 11/2008 | Vesterinen et al. |
| 2009/0129296 A1 | 5/2009 | Grinshpun et al. |
| 2010/0234071 A1 | 9/2010 | Shabtay et al. |
| 2011/0182227 A1 | 7/2011 | Rune et al. |
| 2011/0282931 A1 | 11/2011 | Chen et al. |
| 2012/0140749 A1 | 6/2012 | Caldwell et al. |
| 2012/0303828 A1 | 11/2012 | Young et al. |
| 2013/0010756 A1 | 1/2013 | Liang et al. |
| 2013/0046665 A1 | 2/2013 | Zabawskyj et al. |
| 2013/0072199 A1 | 3/2013 | Miyagawa et al. |
| 2013/0337872 A1 | 12/2013 | Fertl et al. |
| 2014/0023044 A1 | 1/2014 | Sjölinder et al. |
| 2014/0070892 A1 | 3/2014 | Matsuoka et al. |
| 2014/0220923 A1 | 8/2014 | Shoshan et al. |
| 2014/0226496 A1 | 8/2014 | Raleigh et al. |
| 2014/0254382 A1 | 9/2014 | Randriamasy et al. |
| 2014/0259012 A1 | 9/2014 | Nandlall et al. |
| 2014/0269435 A1 | 9/2014 | McConnell et al. |
| 2014/0301192 A1 | 10/2014 | Lee et al. |
| 2014/0307556 A1 | 10/2014 | Zhang et al. |
| 2014/0349611 A1 | 11/2014 | Kant et al. |
| 2014/0376454 A1 | 12/2014 | Boudreau et al. |
| 2014/0376555 A1 | 12/2014 | Choi et al. |
| 2015/0055623 A1 | 2/2015 | Li et al. |
| 2015/0063166 A1 | 3/2015 | Sif et al. |
| 2015/0067676 A1 | 3/2015 | Madani et al. |
| 2015/0097731 A1 | 4/2015 | Russell |
| 2015/0109967 A1 | 4/2015 | Hogan et al. |
| 2015/0113100 A1 | 4/2015 | Tweedale et al. |
| 2015/0139238 A1 | 5/2015 | Pourzandi et al. |
| 2015/0154258 A1 | 6/2015 | Xiong et al. |
| 2015/0163159 A1 | 6/2015 | DeCusatis et al. |
| 2015/0172115 A1 | 6/2015 | Nguyen et al. |
| 2015/0200844 A1 | 7/2015 | Zhu et al. |
| 2015/0236898 A1 | 8/2015 | Bonnier et al. |
| 2015/0237556 A1 | 8/2015 | Giloh |
| 2015/0257012 A1 | 9/2015 | Zhang |
| 2015/0257038 A1 | 9/2015 | Scherzer |
| 2015/0295833 A1 | 10/2015 | Mizukoshi et al. |
| 2015/0304281 A1 | 10/2015 | Kasturi et al. |
| 2015/0319078 A1 | 11/2015 | Lee et al. |
| 2015/0350102 A1 | 12/2015 | Leon-Garcia et al. |
| 2015/0358236 A1 | 12/2015 | Roach et al. |
| 2015/0363219 A1 | 12/2015 | Kasturi et al. |
| 2015/0378753 A1 | 12/2015 | Phillips et al. |
| 2015/0382278 A1 | 12/2015 | Fallon et al. |
| 2016/0014787 A1 | 1/2016 | Zhang et al. |
| 2016/0021588 A1 | 1/2016 | Kamdar et al. |
| 2016/0044136 A1 | 2/2016 | Schiff et al. |
| 2016/0062746 A1 | 3/2016 | Chiosi et al. |
| 2016/0073278 A1 | 3/2016 | Roessler et al. |
| 2016/0080484 A1 | 3/2016 | Earl |
| 2016/0088092 A1 | 3/2016 | Cardona-gonzalez et al. |
| 2016/0094255 A1 | 3/2016 | Meredith et al. |
| 2016/0094395 A1 | 3/2016 | Hu |
| 2016/0094641 A1 | 3/2016 | Rahman et al. |
| 2016/0094668 A1 | 3/2016 | Chang et al. |
| 2016/0095019 A1 | 3/2016 | Cui et al. |
| 2016/0095042 A1 | 3/2016 | Wadhwa |
| 2016/0105821 A1 | 4/2016 | Senarath et al. |
| 2016/0105893 A1 | 4/2016 | Senarath et al. |
| 2016/0112327 A1 | 4/2016 | Morris et al. |
| 2016/0112335 A1 | 4/2016 | Bouanen et al. |
| 2016/0112903 A1 | 4/2016 | Kaushik et al. |
| 2016/0113018 A1 | 4/2016 | Li |
| 2016/0127169 A1 | 5/2016 | Bull et al. |
| 2016/0127230 A1 | 5/2016 | Cui et al. |
| 2016/0127239 A1 | 5/2016 | Kahn et al. |
| 2016/0142282 A1 | 5/2016 | Guo |
| 2016/0150421 A1 | 5/2016 | Li et al. |
| 2016/0150448 A1 | 5/2016 | Perras et al. |
| 2016/0156513 A1 | 6/2016 | Zhang et al. |
| 2016/0164787 A1 | 6/2016 | Roach et al. |
| 2016/0212017 A1 | 7/2016 | Li et al. |
| 2016/0218948 A1 | 7/2016 | Djukic |
| 2016/0218971 A1 | 7/2016 | Basunov |
| 2016/0219076 A1 | 7/2016 | Paczkowski et al. |
| 2016/0234730 A1 | 8/2016 | John et al. |
| 2016/0248860 A1 | 8/2016 | Dunbar et al. |
| 2016/0249353 A1 | 8/2016 | Nakata et al. |
| 2016/0262044 A1 | 9/2016 | Calin et al. |
| 2016/0286043 A1 | 9/2016 | John et al. |
| 2016/0294732 A1 | 10/2016 | Chou et al. |
| 2016/0294734 A1 | 10/2016 | Jang et al. |
| 2016/0295614 A1 | 10/2016 | Lee et al. |
| 2016/0301566 A1 | 10/2016 | Ramasubramani et al. |
| 2016/0352645 A1 | 12/2016 | Senarath et al. |
| 2016/0352924 A1* | 12/2016 | Senarath ........... H04M 15/8016 |
| 2016/0353268 A1 | 12/2016 | Senarath et al. |
| 2016/0353367 A1 | 12/2016 | Vrzic et al. |
| 2016/0353422 A1 | 12/2016 | Vrzic et al. |
| 2016/0353465 A1 | 12/2016 | Vrzic et al. |
| 2016/0359682 A1 | 12/2016 | Senarath et al. |
| 2016/0373372 A1 | 12/2016 | Gillon et al. |
| 2016/0373474 A1 | 12/2016 | Sood et al. |

(56) References Cited

U.S. PATENT DOCUMENTS

| | | |
|---|---|---|
| 2016/0381146 A1* | 12/2016 | Zhang .................. H04L 67/141 |
| | | 709/228 |
| 2016/0381528 A1 | 12/2016 | Lee et al. |
| 2016/0381662 A1 | 12/2016 | Wang |
| 2017/0005390 A1 | 1/2017 | Zakaria et al. |
| 2017/0026887 A1 | 1/2017 | Sirotkin et al. |
| 2017/0034761 A1 | 2/2017 | Narayanan |
| 2017/0054595 A1 | 2/2017 | Zhang et al. |
| 2017/0064591 A1 | 3/2017 | Padfield et al. |
| 2017/0064666 A1 | 3/2017 | Zhang |
| 2017/0070892 A1 | 3/2017 | Song et al. |
| 2017/0078157 A1 | 3/2017 | Zhang |
| 2017/0078183 A1 | 3/2017 | Civanlar et al. |
| 2017/0079059 A1 | 3/2017 | Li et al. |
| 2017/0085493 A1 | 3/2017 | Senarath et al. |
| 2017/0086049 A1 | 3/2017 | Vrzic |
| 2017/0086111 A1 | 3/2017 | Vrzic et al. |
| 2017/0086118 A1* | 3/2017 | Vrzic .................... H04W 36/26 |
| 2017/0104609 A1* | 4/2017 | McNamee .......... H04L 12/4641 |
| 2017/0104688 A1* | 4/2017 | Mirahsan ............ H04L 12/4641 |
| 2017/0141973 A1 | 5/2017 | Vrzic |
| 2017/0142591 A1* | 5/2017 | Vrzic .................... H04W 24/08 |
| 2017/0150376 A1 | 5/2017 | Shoshan et al. |
| 2017/0150399 A1 | 5/2017 | Kedalagudde et al. |
| 2017/0164187 A1 | 6/2017 | Lu |
| 2017/0164212 A1 | 6/2017 | Opsenica et al. |
| 2017/0164349 A1 | 6/2017 | Zhu et al. |
| 2017/0164419 A1 | 6/2017 | Kim |
| 2017/0257276 A1 | 9/2017 | Chou et al. |
| 2017/0257870 A1 | 9/2017 | Farmanbar et al. |
| 2017/0272978 A1 | 9/2017 | Giloh et al. |
| 2017/0295535 A1 | 10/2017 | Sherman |
| 2017/0302369 A1 | 10/2017 | Kwoczek et al. |
| 2017/0303189 A1 | 10/2017 | Hampel et al. |
| 2017/0303259 A1* | 10/2017 | Lee ....................... H04W 28/16 |
| 2017/0318468 A1 | 11/2017 | Aijaz |
| 2017/0332212 A1 | 11/2017 | Gage |
| 2017/0339567 A1 | 11/2017 | Li et al. |
| 2017/0357528 A1* | 12/2017 | Puranik ............... G06F 9/45558 |
| 2017/0367081 A1 | 12/2017 | Cui |
| 2018/0124660 A1 | 5/2018 | Zhang et al. |
| 2018/0131578 A1 | 5/2018 | Cui et al. |
| 2018/0139109 A1 | 5/2018 | Zuerner |
| 2018/0241635 A1* | 8/2018 | Rao ......................... H04L 41/14 |
| 2018/0302877 A1 | 10/2018 | Bosch et al. |
| 2018/0316608 A1 | 11/2018 | Dowlatkhah et al. |
| 2018/0316615 A1 | 11/2018 | Shaw et al. |
| 2018/0316779 A1 | 11/2018 | Dowlatkhah et al. |
| 2018/0332441 A1 | 11/2018 | Shaw et al. |
| 2018/0332442 A1 | 11/2018 | Shaw et al. |
| 2018/0368060 A1 | 12/2018 | Kedalagudde et al. |
| 2018/0368140 A1 | 12/2018 | Centonza et al. |
| 2018/0376407 A1 | 12/2018 | Myhre et al. |
| 2018/0376412 A1 | 12/2018 | Bischinger |
| 2019/0014470 A1 | 1/2019 | Bischinger |
| 2019/0028943 A1 | 1/2019 | Wang et al. |
| 2019/0053102 A1* | 2/2019 | Oohira .................... H04W 8/06 |
| 2019/0132781 A1* | 5/2019 | Arnold .................. G06F 9/5077 |
| 2019/0191305 A1 | 6/2019 | Dowlatkhah et al. |
| 2019/0200174 A1 | 6/2019 | Shaw et al. |
| 2019/0320298 A1 | 10/2019 | Shaw et al. |

FOREIGN PATENT DOCUMENTS

| | | |
|---|---|---|
| CN | 104955172 | 3/2014 |
| CN | 105516312 A | 4/2016 |
| CN | 105979542 A | 9/2016 |
| CN | 106257944 A | 12/2016 |
| EP | 2955631 | 12/2015 |
| JP | 5656803 B2 | 1/2015 |
| KR | 101259548 | 5/2009 |
| KR | 101328344 B1 | 11/2013 |
| KR | 20150132774 | 5/2014 |
| KR | 101531834 | 9/2014 |
| KR | 1473783 | 12/2014 |
| WO | 2000067449 | 11/2000 |
| WO | 2014071084 A2 | 5/2014 |
| WO | 2015031512 A1 | 3/2015 |
| WO | 015057960 | 4/2015 |
| WO | 2015057960 A1 | 4/2015 |
| WO | 2015103297 | 7/2015 |
| WO | 2015198087 A1 | 12/2015 |
| WO | 2016051237 | 4/2016 |
| WO | 2016126238 A1 | 8/2016 |
| WO | 2016126347 A1 | 8/2016 |
| WO | 2016141518 A1 | 9/2016 |
| WO | 2016162467 A1 | 10/2016 |
| WO | 2016192639 A1 | 12/2016 |
| WO | 2016206372 A1 | 12/2016 |
| WO | 2017011827 A1 | 1/2017 |
| WO | 2017023196 | 2/2017 |
| WO | 2017044151 A1 | 3/2017 |
| WO | 2017044153 | 3/2017 |
| WO | 2017054841 | 4/2017 |
| WO | 2017057025 A1 | 4/2017 |
| WO | 2017058067 | 4/2017 |
| WO | 2017071228 | 5/2017 |
| WO | 2017074486 A1 | 5/2017 |
| WO | 2017078770 | 5/2017 |
| WO | 2017119844 | 7/2017 |
| WO | 2017123045 A1 | 7/2017 |
| WO | 2017124003 A1 | 7/2017 |

OTHER PUBLICATIONS

"Dynamic end-to-end network slicing for 5G", White Paper, https://resources.ext.nokia.com/asset/200339, 2016, 1-10.

"Network Slicing", ericsson.com, Apr. 12, 2017.

"Network Slicing for 5G Networks and Services", 5G Americas™, 5gamericas.org, Nov. 2016.

"The Edge of the Cloud 5G Technology Blog", edgeofcloud.blogspot.com, TechBlogger, pen, Apr. 8, 2017.

Akyildiz, Ian, "Wireless software-defined networks (W-SDNs) and network function virtualization (NFV) for 5G cellular systems: An overview and qualitative evaluation", 2015, 14 pages.

Akyildiz, Ian F. et al., "A roadmap for traffic engineering in SDN-OpenFlow networks", Computer Networks 71, 2014, 1-30.

Biral, Andrea et al., "The Challenges of M2M Massive Access in Wireless Cellular Networks", Department of Information Engineering of the University of Padova, Mar. 27, 2015, 1-19.

Bor-Yaliniz, et al., "The new frontier in RAN heterogeneity: Multi-tier drone-cells", 2016, 9 pages.

Chen, Xu, "Intelligence on Optical Transport SDN", International Journal of Computer and Communication Engineering 4.1: 5., 2015.

Datta, Soumya K. et al., "Smart M2M Gateway Based Architecture for M2M Device and Endpoint Management", Internet of Things (iThings), 2014 IEEE International Conference on, and Green Computing and Communications (GreenCom), IEEE and Cyber, Physical and Social Computing (CPSCom), IEEE. IEEE, 2014., 2014, 1-8.

Deak, Gabriel et al., "IOT (Internet of Things) and DFPL (Device-Free Passive Localisation) in a Disaster Management Scenario", Internet of Things (Wf-IoT), 2015 IEEE 2nd World Forum on. IEEE, 2015., Aug. 2, 2012, 1-15.

Dhekne, et al., "Extending Cell Tower Coverage through Drones", 2017, 6 pages.

Ghavimi, Fayezeh et al., "M2M Communications in 3GPP LTE/LTE—A Networks: Architectures, Service Requirements, Challenges, and Applications", IEEE Communication Surveys & Tutorials, vol. 17, No. 2, Second Quarter 2015, May 9, 2015, 525-549.

Gramaglia, Marco et al., "Flexible connectivity and QoE/QoS management for 5G Networks: the 5G NORMA view", Communications Workshops (ICC), 2016 IEEE International Conference on. IEEE, 2016.

Hakiri, et al., "Leveraging SDN for the 5G Networks: Trends, Prospects and Challenges", 2015, 23 pages.

Inam, et al., "Towards automated service-oriented lifecycle management for 5G networks", 2015, 8 pages.

(56) References Cited

OTHER PUBLICATIONS

Katsalis, et al., "5g architectural design patterns", 2016, 7 pages.
Le, Long B. "Enabling 5G Mobile Wireless Technologies", EURASIP Journal on Wireless Communications and Networking 2015.1 (2015): 218., 2015, 1-14.
McCullough, Don, "Why 5G Network Slices?", ericsson.com, Feb. 17, 2015.
Nguyen, Van-Giang et al., "SDN and virtualization-based LTE mobile network architectures: A comprehensive survey", Wireless Personal Communications 86.3, 2016, 1401-1438.
Nikaein, Navid et al., "Network store: Exploring slicing in future 5g networks", Proceedings of the 10th International Workshop on Mobility in the Evolving Internet Architecture. ACM, 2015.
Novo, Oscar et al., "Capillary Networks—Bridging the Cellular and IoT Worlds", Internet of Things (WF-IoT), 2015 IEEE 2nd World Forum on. IEEE, 2015., 2015, 1-8.
Open Networking Foundation, "TR-526 Applying SDN Architecture to 5G Slicing", Issue 1, Apr. 2016, 1-19.
Podleski, Lukasz et al., "Multi-domain Software Defined Network: exploring possibilities in", TNC, 2014.
Sayadi, Bessem et al., "SDN for 5G Mobile Networks: NORMA Perspective", International Conference on Cognitive Radio Oriented Wireless Networks, Springer International Publishing, 2016.

\* cited by examiner

METHOD AND SYSTEM FOR MANAGING UTILIZATION OF SLICES IN A VIRTUAL NETWORK FUNCTION ENVIRONMENT

CROSS-REFERENCE TO RELATED APPLICATIONS

This application is a continuation of U.S. application Ser. No. 15/658,595, filed Jul. 25, 2017, which is hereby incorporated herein by reference in its entirety.

FIELD OF THE DISCLOSURE

The subject disclosure relates to a method and system for managing utilization of slices in a virtual network function environment.

BACKGROUND

According to virtual network function (VNF) architectures, such as 5G networks, services are handled by decentralized VNFs that are instantiated either for a specific service or group of services. In at last some instances, the instantiated VNFs can be reused, depending on certain parameters such as capacity, quality of service (QoS), location, etc. These groups of decentralized VNFs can be referred to as "slices" of the network. As the name eludes to, network slices are parts of a $3^{rd}$ Generation Partnership Project (3GPP) 5G network that are specifically instantiated for certain services. There are number of slices in the network depending on the location such as a dedicated slice relatively close to a large customer enterprise or high-QoS slice for a premium service. These slices can be part of a cloud network running on a default hardware with a given limitations such as number of dedicated processors and memory, etc. The use, sharing and re-use of slices promotes an efficient utilization of the underlying physical network resources.

BRIEF DESCRIPTION OF THE DRAWINGS

Reference will now be made to the accompanying drawings, which are not necessarily drawn to scale, and wherein.

DETAILED DESCRIPTION

Figure 1:
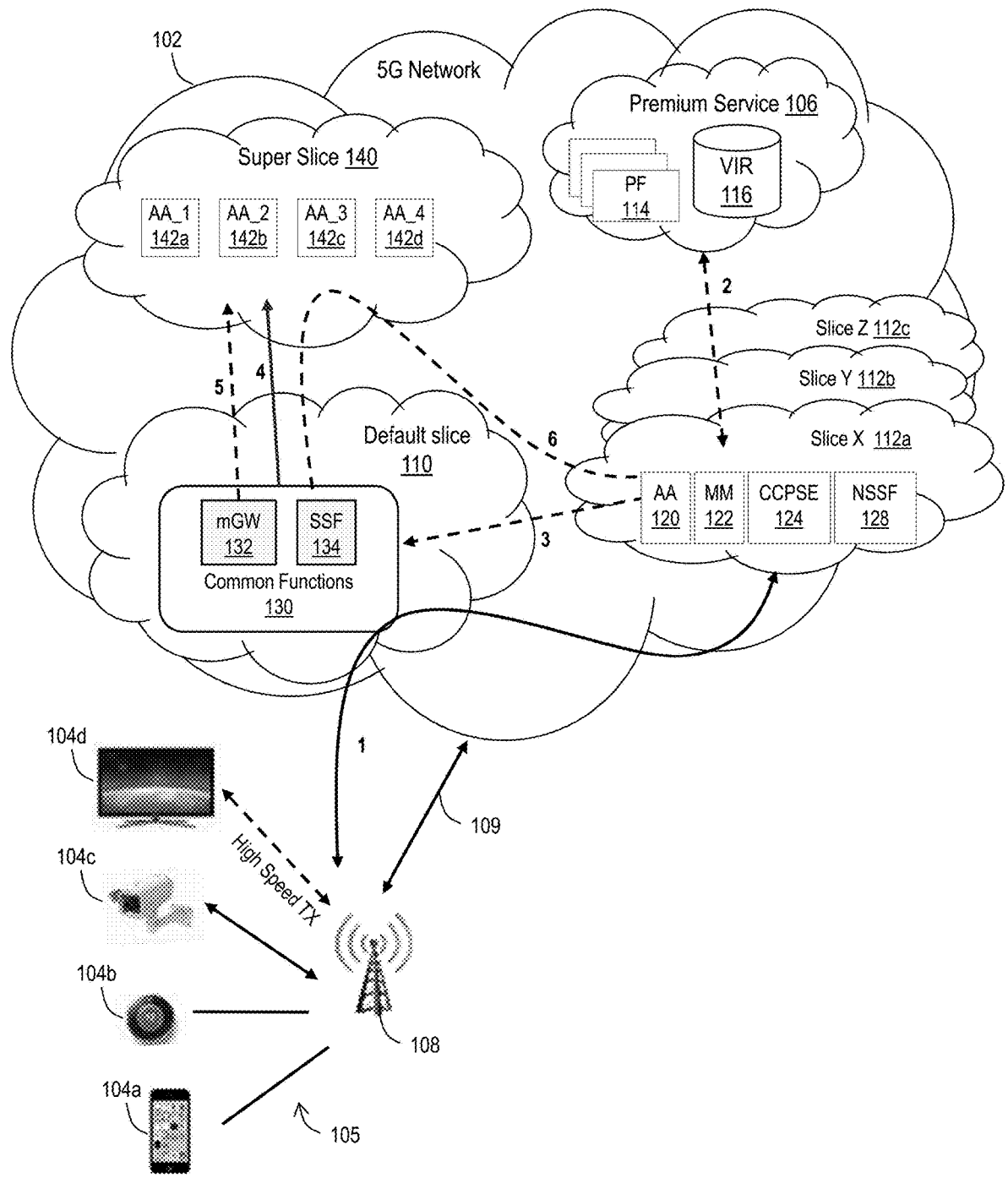
FIG. 1 depicts an illustrative embodiment of an example communication network for providing services to communication devices.

The subject disclosure describes, among other things, illustrative embodiments for dynamic assignment of specialized network slices including groups of VNFs that perform or otherwise support performance of rigorous activities generally beyond the scope of dedicated slices including different groups of VNFs. Such specialized slices can be referred to as special or super slices. Super slices can provide extra capabilities, e.g., on demand, that extend beyond designated performance, and in at least some instances, beyond capabilities of normally provisioned or dedicate slices. The extra capabilities of the super slice can address exceptions that may occur during which the dedicated slices are unable to accommodate full renderings of their respective services. Other embodiments are described in the subject disclosure.

One or more aspects of the subject disclosure include a device, including a processing system including a processor, and a memory that stores executable instructions. The instructions, when executed by the processing system, facilitate performance of operations, including identifying a first group of virtual network functions instantiated within a software defined network and adapted to perform a first activity that facilitates delivery of a dedicated service to wireless equipment of a first user under normal conditions. An occurrence is detected of a condition whereby delivery of the dedicated service to the wireless equipment of the first user requires a second activity, wherein the first group of virtual network functions is not designated to perform the second activity. Access to a second group of virtual network functions is facilitated responsive to the detecting of the occurrence of the condition. The second group of virtual network functions when instantiated within the software defined network are adapted to perform the second activity that facilitates delivery of the dedicated service to the wireless equipment of the first user during the occurrence of the condition.

One or more aspects of the subject disclosure include a process, including determining, by a processing system including a processor, a first group of virtual network functions instantiated within a software defined network and adapted to perform a first activity that facilitates delivery of a dedicated service to wireless equipment of a first user under normal conditions. An occurrence of a condition is detected by the processing system, whereby delivery of the dedicated service to the wireless equipment of the first user requires a second activity, wherein the first group of virtual network functions is not designated to perform the second activity. Access to a second group of virtual network functions is facilitated, by the processing system and responsive to the determining of the occurrence of the condition. The second group of virtual network functions when instantiated within the software defined network are adapted to perform the second activity that facilitates delivery of the dedicated service to the wireless equipment of the first user during the occurrence of the condition.

One or more aspects of the subject disclosure include a machine-readable storage medium, including executable instructions that, when executed by a processing system including a processor, facilitate performance of operations. The operations include determining a first group of virtual network functions instantiated within a software defined network and adapted to perform a first activity that facilitates delivery of a dedicated service to wireless equipment of a first user under normal conditions. An occurrence of a condition is determined whereby delivery of the dedicated service to the wireless equipment of the first user requires a second activity, wherein the first group of virtual network functions is not designated to perform the second activity. Access to a second group of virtual network functions is facilitated, responsive to the determining of the occurrence of the condition. The second group of virtual network functions when instantiated within the software defined network are adapted to perform the second activity that facilitates delivery of the dedicated service to the wireless equipment of the first user during the occurrence of the condition.

In a virtual network function (VNF) environment, one or more VNFs take on responsibilities of handling network functions that run on one or more virtual machines (VMs) on top of hardware of a physical networking infrastructure, such as routers, switches, etc. It is understood that the disclosure provided herein can apply, without limitation, to any VNF environment. The various examples disclosed herein related to so-called 3GPP 5G network services. In particular, the 5G network services can be handled by one or more virtual network functions that can be decentralized. Alternatively or in addition, the one or more virtual network functions can be instantiated for a specific service or group of services. In at least some embodiments, one or more of the virtual network functions can be reused, e.g., depending up on certain parameters such as capacity, QoS, location, e.g., of wireless communication equipment supported by the 5G network, and the like.

Different groups of VNFs, which may be decentralized, are sometimes referred to as "slices" of the network. Generally speaking, a particular slice relates to a portion of a 5G wireless mobile network specifically instantiated for a particular service or group of services. It is understood that in any practical 5G application, there may be a number of slices in the network depending upon a location(s) one or more of supported wireless communication equipment. For example, a dedicated slice can be instantiated for a customer enterprise, e.g., in relatively close physical and or network proximity to a large customer enterprise. Alternatively or in addition, a dedicated slice can be instantiated to provide a relatively high QoS, e.g., in association with a premium service, a premium level of subscription, and the like. In at least some embodiments, one or more of the slices are part of a cloud network. It is understood that a cloud network can be adapted to run physical resources, such as default hardware, which generally presences at least some limitations, such as number(s) of dedicated processors, class(es) of physical processors, memory size and/or type, storage and the like.

As slices are generally associated related tasks and/or activities, it is understood that the slice(s) can be configured and/or otherwise defined in association with a predetermined scope and/or technical requirement. The scope and/or technical requirement can be a default value, e.g., according to one or more of a class of user and/or a class or type of equipment of the user, a level of subscription associated with the user, a class and/or type of service, function, and the like. Accordingly, a VNF, when instantiated, is adapted to perform and/or otherwise provide the tasks and/or activities according to the predetermined scope and/or technical requirement.

In at least some scenarios, a predetermined scope of a network slice can be considered, without restriction, as a capacity value. It is understood that in any practical realization, a demand upon resources of the network slice can vary and/or otherwise fluctuate. Such variations and/or fluctuations can result from one or more of a requirement of a type of service supported by the network slice, a location of the wireless equipment associated with the network slice, an environmental condition, a condition of the network, a request and/or requirement of one or more of the mobile network service provider, a third-party service provider, equipment of the user, and/or another entity, such as a network operation and maintenance entity, an enterprise customer, a third-party entity, e.g., a government entity, and the like.

By way of non-limiting example, one or more slice(s) are associated with a particular activity, such as a calculation requiring an orchestration of a repository. It is understood that such in-scope services can include calculations requiring orchestration of up to some maximum number of repositories. Accordingly, one or more VNFs of the group of VNFs of the associated slice(s) are configured or otherwise adapted to accommodate the in-scope services. It is further understood that under some circumstances, it may be advantageous and/or necessary for the services to require orchestration a relatively large orchestration of repositories, e.g., larger than those anticipated or otherwise associated with the in-scope services. According to the techniques disclosed herein, so-called out-of-scope or special activities can be accommodated and/or otherwise serviced based one or more other slices, e.g., including one or more other groups of VNFs that are distinguishable from slice(s) and/or VNFs supporting in-scope activities. These other slices are referred herein to as special slices and/or super slices. The super slices can perform and/or otherwise support one or more functions and/or services, such as one or more of a processing capacity, a memory capacity, a communication capacity, a storage capacity, and the like, on an as-need and/or on-demand manner to facilitate delivery of a service to the equipment of a user during periods of exceptional and/or rigorous activity. In at least some embodiments, a super slice can be located anywhere on a network. For example, in 5G examples, the super slice and can be reached and/or otherwise accessed by way of a default slice and/or a managing gateway (mGW).

Beneficially, the super slice models disclosed herein allow dedicated slices to be sized according to an anticipated capacity, rather than a peak capacity. The super slices can provide services to accommodate peak capacity in total and/or above the anticipated or design capacity of dedicated slices. Accordingly, network resources of the super slice are employed when needed without having to sit idle during periods of normal operation. To the extent peak demands of different services occur at different times and/or locations, it is understood that common network resources, e.g., according to the super slice, can support multiple services and/or applications. To the extent multiple services or applications encounter overlapping peak demands, it is understood that the super slice can include some measure of elasticity. For example, the super slice can include a scalable model that can be scaled based on one or more of network conditions, requests for super slice support and the like.

In general, network slices can be identified, instantiated and/or otherwise created to facilitate services utilized by individual subscribers and/or subscribers of enterprises clients, such as large business, governmental organizations, social groups, e.g., affinity groups, and the like. These slices are generally adapted or otherwise configured to perform a particular task or group of tasks. It is understood that in at least some embodiments, the task(s) can depend upon one or more of a location, e.g., location of the equipment of the subscriber and/or a location of the enterprise client, a QoS and/or a capacity of a particular service. In at least some embodiments, slices of the network are combinations of VNFs instantiated by a service orchestration manager. The slice(s) can be instantiated on default hardware in order to reduce network complexity and/or to realize capital savings, e.g., on proprietary hardware and/or software. However, within any service infrastructure there may be exceptions whereby a slice capability will not accommodate a full rendering of a particular service.

For such unlikely and/or infrequent situations and/or scenarios, e.g., in case of an emergency and/or need to perform a very specialized activity such as large calculation of data with in number of data bases, one or more super slices, one or more activities can be assigned to one or more other slices, e.g., super slice(s). In at least some embodiments, the super slice(s) are instantiated to serve existing slices. For example, the super slice(s) can be dynamically assigned to perform specific tasks depending one or more of a priority, availability, network condition(s), user equipment type, subscription level(s), service type(s), location(s), and the like.

For example, while a particular service is running within a predetermined slice of a network and an emergency situation occurs, a higher and/or greater capacity and/or performance may be necessary to continue provision of the particular service. In order to continue providing the particular service, it may be necessary to expand and/or provision one or more premium and/or emergency services, at least during the occurrence of the special, e.g., an emergency situation. At least one example of a special situation includes a security attack, e.g., based on a distributed denial of service (DDoS) attack, or a heightened security requiring more intense computational processing.

FIG. 1 depicts an illustrative embodiment of another example communication network 100, e.g., a 3GPP 5G network adapted to provide services to equipment of users or subscribers. In this example, the equipment includes wireless devices, such as a smart phone and/or tablet device 104a, an intelligent home or building controller, such as a smart thermostat 104b, a surveillance monitor 104c and/or a smart television 104d, generally subscriber equipment 104. It is understood that the user equipment can include mobile communication devices, wireless devices that may be mobile or stationary, e.g., smart utility meters of a building including a mobile cellular radio, and in at least some instances, wired devices, such as cable television, a satellite receiver, and/or other network accessible devices connected to physical network resources, and the like.

The subscriber equipment 104 can access resources of the 5G network by way of a radio access network (RAN) 105. The RAN 105 can include a wireless access terminal 108, such as that associated with a relatively large cell, e.g., a macro cell, and/or a relatively small cell, e.g., a picocell and/or femtocell. For example, the wireless access terminal 108 can include an evolved NodeB (eNB) adapted to support 4G and/or 5G protocols. For 5G applications, the eNB is sometimes referred to as a "gNB" 108. The gNB 108 is in communication with extended resources of the 5G network 102, e.g., by way of a backbone network 109. In at least some instances, the RAN 105 and/or the wireless access terminal 108 support non-licensed frequency spectrum operations, e.g., according non-5G technologies, such as Wi-Fi and/or Bluetooth.

The example 5G network includes a default slice 110. The default slice can provide independent processing of control plane messages and user plane messages, e.g., to coordinate access to dedicated slices, services, applications, mobility, and so on. In many applications, a default slice 110 is established in association with a particular user device and/or group of user devices, e.g., upon discovery of and/or attachment of the device(s) to the network. In at least some sense, the default slice can be analogized to a default bearer of a 3GPP 4G network. This may occur when a subscriber equipment 104 is first powered on, transitions from a dormant mode to an active mode and/or as a result of mobility of the device 104 to within a region of coverage of the wireless access terminal 108. It is understood that the subscriber equipment 104 can operation in association with one or more services, applications and/or functions accessible via the 5G network 102. The services can include, without limitation, streaming audio services, e.g., streaming music services, interactive voice over IP (VoIP), streaming video, telephone, short message service, access to the World Wide Web (WWW), file transfer, cloud storage, social networking, gaming, home and/or building automation, home and/or building security, medical monitoring, emergency services, and so on.

In at least some embodiments, the network 102 includes one or more dedicated slices, e.g., slice_X 112a, slice_Y 112b, and slice_Z 112c, generally 112. The dedicated slices 112 can be established on one or more of a per-service basis and/or a per-subscriber basis. The dedicated slices 112 can be provisioned for individual users and/or classes of users, e.g., according to one or more of a subscription level, a subscriber equipment type, a location, an association, e.g., an employee of an enterprise subscriber, a network condition and so on. In this manner, it is foreseeable that at least some of the dedicated slices 112 can be shared. AT least some of the dedicated slices include one or more functional modules or agents, such as a authentication and/or access module 120, a mobility module 122, a common control plane processing module 124, and a network slice selection function 128.

The default slice 110 and/or dedicated slices 112 can include one or more functions. By way of example, the default slice 110 includes common functions 130 that can include functions implementing an mGW 132, and/or a slice selection function (SSF) 134. The mGW 132 can include functions supporting 5G networking, as generally understood by those familiar with the principles of 3GPP 5G, alone or in combination with other functionality disclosed herein, e.g., in association with access to super slices. In some embodiments, the SSF 134 can facilitate access to one or more of the dedicated slices 112. Alternatively or in addition, the SSF 134 can facilitate access to one or more super slices 140.

The illustrative example includes one super slice 140. It is understood that the network can instantiate one or more super slices 140, e.g., in response to one or more of anticipated demand, actual demand, network conditions, environmental conditions, user requests, service provider requests, equipment requests, and the like. The super slice 140 can be configured to provide, support and/or otherwise facilitate a particular service, task, activity, and the like. Alternatively or in addition, the super slice 140 can be configured to provide one or more general services, tasks, activities, and the like, such that the same super slice 140 can service demand and/or request from a variety of different dedicates slices 112.

The illustrative super slice 140 includes access modules or agents, 142a, 142b, 142c, 142d, generally 142. The access modules 142 can perform one or more of authentication and/or authorization of requests to the super slice 140. Without restriction, it is understood that access to the super slice 140 can depend on one or more of subscription level, network conditions, nature of the request, priority of the request, locations, times of day/days of week, and so on.

In some embodiments, one or more of the dedicated slices 112 facilitate delivery of a premium service of function to the subscriber equipment 104. In the illustrative example, the network 102 includes a premium service 106 including one or more premium functions 114 and/or one or more virtual repositories 116. The premium service is generally well understood such that provisioning of the associated dedicated slice_X 112*a* allocates sufficient VNFs to accommodate access to and/or delivery of the service 106. In at least some instances, special circumstances are detected by way of one or more of the dedicated slice 112 and/or the premium service 106.

In the illustrative example, the user equipment 104 establishes access to regular service, e.g., "business as usual," by way of the default slice 110 and one or more of the dedicated slices 112. According to the illustrative example, business as usual can include access to one or more premium functions 114 and/or virtual repositories 116 of a premium service 106 by way of the default slice and the dedicated slice. A first line, labeled "1" is illustrated between the user equipment 104 and the dedicated slice 112 by way of the default slice 110. It is determined, e.g., by one or more of the default slice 110, the dedicated slice 112*a*, the premium service 106 and/or some other entity, that the capacity of the existing slices 110, 112*a* is insufficient. Namely, an exceptional requirement for access to resources beyond those allocated is determined. To the extent the determination is made by the premium service 106, e.g., by detecting and/or otherwise identifying an emergency situation, the condition and/or request is conveyed to the dedicated slice 112. A dashed arrow labeled "2" indicative of the message exchange is illustrated between the premium service 106 and the dedicated slice 112*a*.

The dedicated slice 112*a*, e.g., by way of the NSSF 128 and/or the CCPSE 124, generates and/or passes along a request for accessing the super slice 140, e.g., as a dedicated high performance slice. The request is first passed to the common functions 130 of the default slice 110, e.g., according to a dashed line labeled "3." Continuing with the illustrative example, the mGW 132 sends a request to the super slice 140 and/or an SDN controller and/or orchestrator for accessing, e.g., by way of leasing a right to use the super slice 140. A line between the common functions 130 and the super slice 140, labeled "4"

According to a policy, a business rule and/or another parameter access to the super slice 140 granted and new connection to super slice 140 is setup, e.g., according to dashed line between the default slice 110 and the super slice 140. In at least some embodiments, resources of the super slice 140 can be "chained" and/or otherwise associated with a dedicated slice 112. In the illustrative example, resources of the super slice 140 are chained to the dedicated slice 112*a* associated with the premium service 106 responsible for the exceptional condition. A dashed line extending from the default slice 110 to the dedicated slice 112*a* by way of the super slice 140 labeled "6" represents the chained association.

Upon a completion and/or resolution of the exceptional conditions, it is understood that the network 102 can return to a normal configuration, e.g., releasing the super slice 140. Accordingly, the super slice can be reserved as a resource to serve requests from other premium services 106, other dedicated slices 110, other devices 104, and/or future requests from the same premium service 106, dedicated slice 110, and/or devices 104.

In at least some embodiments an mGW of a 5G network provides a request for leasing a right to access and/or otherwise use a super slice. Access to the super slice can be granted according to one or more of a policy, a business rule and/or another parameter. Once granted, a new connection to can be set up to access resources of the super slice. It is understood that the super slice can be located anywhere on the network. As disclosed in more detail below, the super slice can be reached by a default slice and/or an mGW. Without restriction, the mGW can grant access to super slices on demand, e.g., according to one or more of a service level agreement (SLA), smart billing (dedicated service charges differently when Super slice used depending of supply and demand of the super slice capacity and availability. In at least some embodiments, the mGW can create additional capacity, e.g., depending upon one or more of policy and preferences, by reducing other services usage of the service slice.

Beneficially, dynamic allocation of a special, e.g., a super, slice, can reduce an overall cost capital expenditure and/or operational expenditure. The savings can be realized by way of a core network that provides relatively simple network slices, e.g., provisioned without regard to any unlikely, special and/or sparsely required resources. This can be accomplished, as disclosed herein, by provisioning network complexity through assignment of more complex tasks to one or more super slices. For instance, if there is super security slice, there is no need to add every permutation of security algorithms into every slice. In addition to a reduction of cost of network operation and maintenance, equipment of subscribers enjoy access to special capabilities and qualities of all the services across the network, e.g., for exceptional situations, by granting access to super slices.

Figure 2:
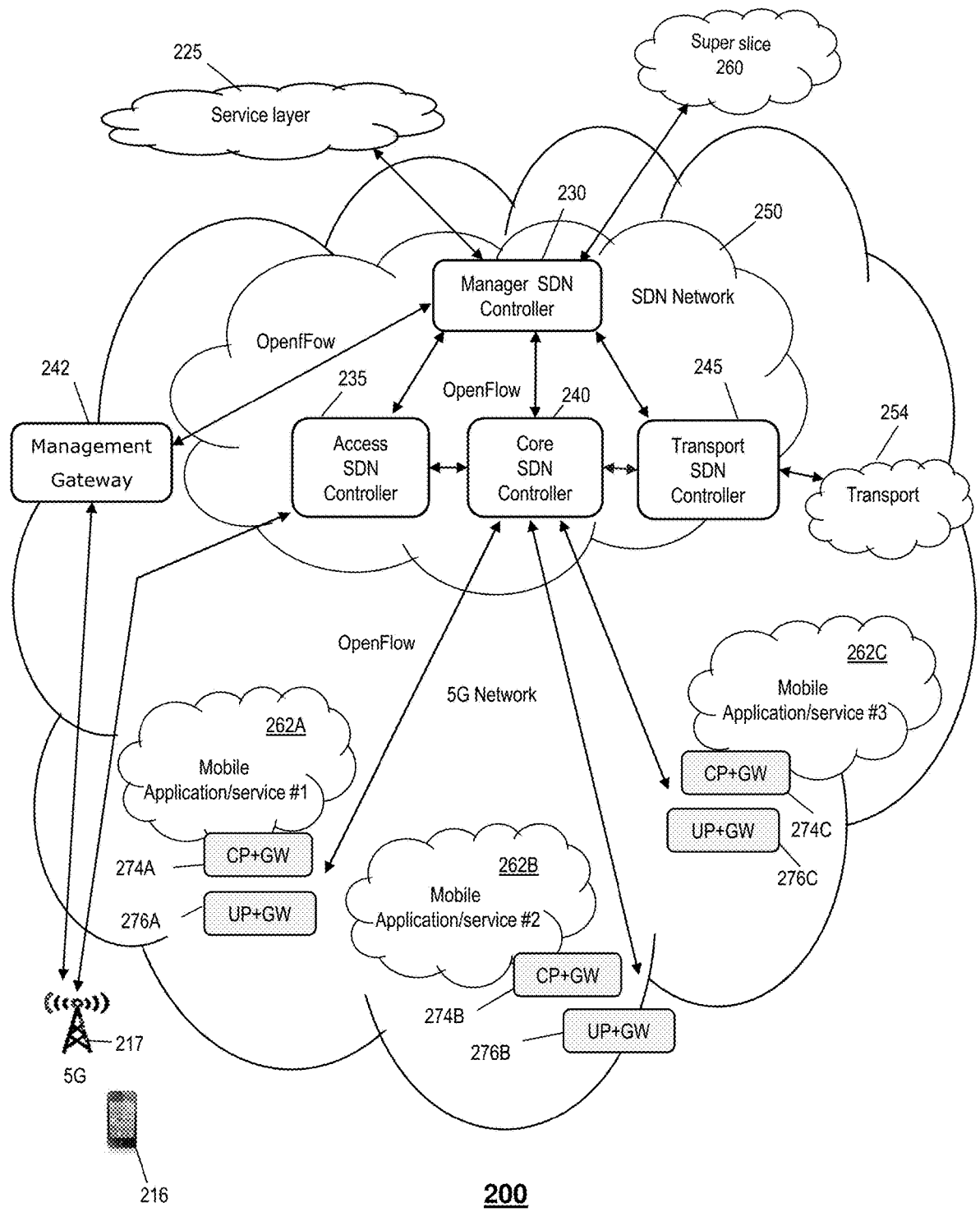
FIG. 2 depicts an illustrative embodiment of another example communication network for providing services to communication devices.

Referring now to FIG. 2, illustrative embodiments of an exemplary communication network for providing services to communication devices is shown. In one or more embodiments, a communications system 200 can include a Software Defined Network (SDN), or SDN Network 250. The SDN Network 250 can be controlled by one or more SDN Controllers. For example, the SDN network 250 can include a manager SDN controller 230, an access SDN controller 235, a Core SDN controller 240, and/or a transport SDN controller 245. The functions of the different types of SDN Controllers 230-245 are further described below. Each SDN controller, such as, for example and ease of illustration, the manager SDN controller 230, can be provided by a computing system executing computer-executable instructions and/or modules to provide various functions. In one or more embodiments, multiple computer systems or processors can provide the functionality illustrated and described herein with respect to each SDN controller 230-245. To simplify the description of the concepts and technologies described herein, each SDN controller 230-245 is illustrated and described herein as being provided by a single computing system. However, it should be understood that this example is illustrative and therefore should not be construed as being limiting in any way.

In one or more embodiments, each SDN controller 230-245 can include various components and/or can be provided via cooperation of various network devices or components. For example, each SDN controller 230-245 can include or have access various network components or resources, such as a network resource controller, network resource autonomous controller, a service resource controller, a service control interpreter, adapters, application programming interfaces, compilers, a network data collection and/or analytics engine. Each SDN controller 230-245 also can include or access information describing available resources and network information, such as network object statistics, events or alarms, topology, state changes. In one or more embodiment, each SDN controller 230-245 can use and/or can generate and/or access system configurations, including configurations of resources available to the manager SDN controller 230 for proving access to services.

In one or more embodiments, the communication system 200 can include a service-supporting portion, referred to generally as a service layer 225. The service layer 225 can provide access to services and/or applications, e.g., including third-party services and/or applications at a higher application layer. The service layer 225 may include capability servers, e.g., owned by or otherwise under the direction of an operator of the communication network 200, that can access and provide access to application layer servers, e.g., including application layer servers owned by third-party content providers via open and/or secure Application Programming Interfaces (APIs). Alternatively or in addition, the service layer 225 can provide an interface to a core portion of the network referred to generally as a core network. The communication network 200 can also include access to applications, such as fixed applications and mobile applications 262A-C.

In one or more embodiments, the communication network 200 can include an SDN network 250. The SDN network 250 can include one or more SDN controllers 230, 235, 240 and 245 that can provide different types of functions and can be arranged in virtual layers. For example, the SDN network 250 can include a manager SDN controller 230 that controls and coordinates functioning of the SDN network 250. The manager SDN controller 230 can be a top-level management system in the architecture. Below the manager SDN controller 230, a next level of SDN controllers 235, 240 and 245 can be instantiated and configured by the manager SDN controller 230 to provide specific classes of functionality in the architecture. For example, the manager SDN Controller 230 can provide level-3 functionality to control and coordinate service control, configuration, and data flow in the communication network 200. The manager SDN controller 230 can, as needed, instantiate, configure, and/or direct level-2 SDN controllers 235, 240 and 245 for controlling access, core, and/or transport capabilities in the communication network 200.

In one or more embodiments, the SDN network 250 can allow the communication network 200 to separate control plane operations from a data plane operations and can enable layer abstraction for separating service and network functions or elements from physical network functions or elements. In one or more embodiments, the manager SDN controller 230 can coordinated networking and provision of applications and/or services. The manager SDN controller 230 can manage transport functions for various layers within the communication network and access to application functions for layers above the communication network. The manager SDN controller 230 can provide a platform for network services, network control of service instantiation and management, as well as a programmable environment for resource and traffic management. The manager SDN controller 230 also can permit a combination of real time data from the service and network elements with real-time or near real-time control of a forwarding plane. In various embodiments, the manager SDN controller 230 can enable flow set up in real-time, network programmability, extensibility, standard interfaces, and/or multi-vendor support. In one embodiment, interactions between layers of the communication network 200 can be based upon policies to determine optimum configuration and rapid adaptation of the network 200 to changing state and changing customer requirements for example, predicted demand, addition of new users, spikes in traffic, planned and unplanned network outages, adding new services, and/or maintenance.

In one or more embodiments, each SDN controller 230-245 can instantiate a virtualized environment including compute, storage, and data center networking for virtual applications. For example, the manager SDN controller 230 can direct on-demand instantiation of network elements, such as Virtual Network Function (VNF) elements at on-demand locations to support network services for a customer or for the autonomous network resource controller where capacity is needed or where backup of network elements due to failures. Service functions can be moved and/or changed in response to traffic flow rather than traffic flow moving to the desired service functions.

In one or more embodiments, the manager SDN controller 230 can cooperate with a cloud orchestrator in instantiating level-2 SDN controllers 235-245 and network services to support the network configuration in connecting Virtual Machined (VMs) that the cloud orchestrator is setting up. The network instantiation and configuration can include configuration of the virtual networks, which may operate at various physical levels in a cloud server architecture, including hypervisor, top of rack, cloud network fabric, and/or IP provider edge, which can connect the cloud network with the service provider WAN network. In one or more embodiments, the level-2 SDN Controllers 235-245 can cooperate with a cloud orchestrator in instantiating VNF elements for use in, for example, the Core Network.

In one or more embodiments, a communication device 216 can operate in communication with and/or as a part of a communications network 200. The functionality of the communication device 216 may be provided by one or more server computers, desktop computers, mobile telephones, smartphones, laptop computers, set-top boxes, other computing systems, and the like. In at least some embodiments the devices can include virtually any IP enabled device, e.g., including without limitation home security systems, vehicles, appliances, buildings, medical devices, wearable devices, smart meters, and the like. For examples, the communication devices can include any device operable according to an Internet of Things paradigm. It should be understood that the functionality of the communication device 216 can be provided by a single device, by two similar devices, and/or by two or more dissimilar devices. For purposes of describing the concepts and technologies disclosed herein, the communication device 216 is described herein as a workstation or personal computer. It should be understood that this embodiment is illustrative, and should not be construed as being limiting in any way.

The communication device 216 can execute an operating system and one or more application programs. The operating system can be a computer program that controls the operation of the communication device 216. The application programs can be executable programs that are configured to execute on top of the operating system to provide various functions. According to various embodiments, the application programs can include web browsers, productivity software, messaging applications, combinations thereof, or the like. In one or more embodiments, the application programs of the communication device 216 can include applications that enable interactions between the communication device 216 and other devices or entities. In some contemplated embodiments, the application programs can provide functionality for interacting with and/or communicating with the communication network 200 and, in turn, having communications analyzed by the manager SDN controller 230 or, alternatively, any of the SDN Controllers 230-245 in the SDN network 250.

According to various embodiments, the SDN network 250 can include and/or access resources, such as a service orchestrator, a software defined network controller, a cloud orchestrator, and/or other elements. It should be understood that the manager SDN controller 230, and any of the above-described components, or combinations thereof, may be embodied as or in stand-alone devices or components thereof operating as part of or in communication with the communication network 200. As such, the illustrated embodiment should be understood as being illustrative of only some contemplated embodiments and should not be construed as being limiting in any way.

In one or more embodiments, the SDN network 250 can automatically evaluate application service requirements that have been requested from the communication system 200. In one embodiment, a service request can be received from a subscriber, or customer, or customer device. For example, a request can be receive via a portal. The service request can be provided to the soft manager SDN controller 230 for service creation, instantiation, and management. According to various embodiments, the service request can be analyzed by the manager SDN controller 230. In one embodiment, the manager SDN controller 230 can access or query the service layer 225 to determine service requirements needed for fulfilling the service request.

In one or more embodiments, a service request can be received by equipment of a subscriber or customer (e.g., via the portal), and provided to the SDN network 250 for service creation, instantiation, and management. The service request can include application objects and/or requests for particular services or functions. Thus, the service request can include objects that define service functions that are desired, requests for generation of services and/or requests for particular functionality, queries, combinations thereof, or the like. It should be understood that these examples are illustrative and therefore should not be construed as being limiting in any way. According to various embodiments, the service request can be analyzed by the SDN controller 230-245 and a set composed of a directed graph and the associated model or model files are selected. The model can define features of the service and can generate in a programming language or format such as XML, Yang models, other types of files, combinations thereof, or the like. The selected directed graph can be used at runtime to fill in the event-specific details from the API, the resource allocations per the directed graph and the resource model, and one or more state changes in the network through the adapters.

In one or more embodiments, the communication device 216 can communicate with the communication network 200 via a wireless communication link. For example, the communication device 216 can be a mobile communication device 216 that communications via a cellular communication link through a Radio Access Network (RAN) technology. A mobility network 217, such as a 3GPP wireless network, e.g., an LTE network or a 5G network, can establish wireless communications with the communication device 216, where the communication device 216 can move from cell to cell, while maintaining a communication session. In another example, the communication device 216 can communication with the communication network via a non-3GPP wireless link, e.g., a WiFi network link. The WiFi network can be, for example, a local area network (LAN) that is supported by a router capable of wireless communications or can be an individual device, such another mobile communication device 216 capable of acting as an intermediary (e.g., a Hot Spot). In one or more embodiments, the communication network 200 can be a converged network capable of supporting a wide range of access, core and transport networks, such as wireline, wireless, satellite, 3GPP, non-3GPP, and/or 5G. It is understood that the radio frequency spectrum used in wireless access can include licensed spectrum, unlicensed spectrum and combinations thereof.

In one or more embodiments, a Management Gateway (MGW) 242 can be included in the communication network 200. The MGW 242 can capture traffic entering the communication network 200 from various communication devices 216 and/or various Access Networks (AN) 217. The MGW 242 can communicate with the SDN network 250, e.g., with the manager SDN controller 230, regarding traffic entering the communication network 200. In one embodiment, the MGW 242 and the manager SDN controller 230 can communicate via a communications protocol, such as an OpenFlow® protocol that provide access to a forwarding plane of a network device, such as a switch or router, over a network. OpenFlow® is a registered trademark of the Open Networking Foundation of Palo Alto, Calif. The MGW 242 can inform the management SDN controller 230 of information regarding services sought by one or more communication devices 230. The management SDN controller 230 can analyze these services to determine service functions and/or network data flows that would be required to facilitate delivery of these services to the communication devices 216.

In one or more embodiments, the manager SDN controller 230 can query the service layer 225 to determine the functional and/or resource requirements to provide the service to the communication device 216. In one or more embodiments, the service requirements can include service feature data. In one or more embodiments, this service feature data can be generated by or provided to the service layer 225 and/or the manager SDN controller 230 via interactions between the communication device 216 and the portal. For example, in the process of making the service request, the communication device 216 can make a series of selections from menus, drop-down lists, fields, tables, or other data or object selection mechanisms that may be provided by the portal and/or the application programs executing on the communication device 216. In some embodiments, the application programs can include a web browser application and/or other application that can obtain data from the portal. In one or more embodiments, the application programs can use the data to generate and present a user interface at the communication device 216. The user interface can include possible service features, and a user or other entity can select the desired features, drag and drop desired features, and/or otherwise indicate desired features in a service.

In some embodiments, the SDN controller 230 can query the service layer 225 to determine an occurrence of an exceptional functional and/or resource requirement. Upon detection or discover of such exceptional requirements, the SDN controller 230 can facilitate access to and/or provisioning of a super slice 260. According to the subject disclosure, one or more super slices 260 can provide or otherwise support provisioning of the exceptional functional and/or resource requirements.

In one or more embodiments, the manager SDN controller 230 can analyze policies or policy defined for a service. This policy can include network engineering rules, which can be defined by a network designer, engineer, business unit, operations personnel, or the like, or a subscriber policy, which can be defined during ordering of the service. Subscriber policies can include, for example, service level agreements ("SLAs"), location restrictions (e.g., locations at which the services are allowed or not allowed), bandwidth ranges, time restrictions (e.g., times of day, days of week, or other times at which the service is allowed or not allowed), security restrictions or policies, combinations thereof, or the like.

In one or more embodiments, the manager SDN controller 230 can determine from the service model one or more physical network functions or other resources that will be needed or used to support the service. The manager SDN controller 230 also can analyze the service model to identify one or more virtual network functions or other functions that will support or provide the features of the service. The manager SDN controller 230 also can determine, via analysis of the service model, process flows between the various resources and/or functions used to support or provide the service features.

In one embodiment, the manager SDN controller 230 can communicate with each of the instantiated SDN controllers 235-245 via a communication interface, such as an interface that applies OpenFlow® data network protocols. In addition, the SDN controllers 235, 240, 245 of level-2 to can communicate among themselves to determine resource capabilities, capacities, shortages, failures, and/or warnings. In one or more embodiments, if the manager SDN controller 230 determines that the requested service can be performed, within system margins, using the currently instantiated SDN controllers 235, 240, 245, then the manager SDN controller 230 can decide to direct the SDN controllers 235, 240, 245 to perform the service for the communication device 216. Alternatively, if the manager SDN controller 230 determines a shortage or shortfall in a needed resource, then the manager SDN controller 230 can direct instantiation of one or more new SDN controller 235-245 to perform all or part of the requested service. For example, the manager SDN controller 230 may determine that the service request associated with the example communication device 216, or many communication devices 216, or merely received at the communication network 210 from an indeterminate device (e.g., a request for resources from another network) requires additional core SDN controller capacity 240. In this case, the manager SDN controller 230 can direct the instantiation of additional core SDN controller 240 capacity from a set of configurable SDN controller devices at the cloud.

In one or more embodiments, the access SDN controller 235 can control, direct, configure, and monitor access resources 217 and 219 for the network 200, such as eNodeB controllers, RAN controllers, and or WiFi controllers. In another example, the core SDN controller 240 can control, direct, configure, and monitor core resources 274A-276C for the core network of the communication network 200, such as Gateways (GW) for Control Plane (CP) 274A-C, User Plane (UP) 276A-C, and/or legacy (i.e., combined user and control plane). In another example, the transport SDN controller can control, direct, configure, and monitor transport layer services 254, such as a Multiprotocol Label Switching (MPLS) network, Fiber Optics network, and/or a Backbone network.

In one or more embodiments, the manager SDN controller 230, adapted to support level-3 functionality, can manage one or more sets of level-2 SDN controllers 235-245 in the SDN network 250. The manager SDN controller 230 can configure and/or reconfigure the instantiated SDN controllers 235-245 to optimize the SDN network 250 according to loading created by the service requests. For example, the manager SDN controller 230 can automatically instantiate multiple levels of fully distributed SDN controllers 235-245. Likewise the level-2 SDN controllers 235-245 can instantiate and/or configure and/or reconfigure VNF elements 274A-276C at level-1. Each of the SDN controllers 230-245 can support instantiation "on the fly" based on new requests, the ending of old requests, monitoring network traffic, and/or requesting loading information from any of the other SDN controllers 235-245 and/or the VNF elements 274A-276C.

Alternatively or in addition, one or more of the SDN controllers 230, 235, 240, 245 can support instantiation "on the fly" based on a determination that a particular slice is unable and/or unlikely adapted to fulfill or otherwise satisfy one or more services, e.g., based on exceptional functional and/or resource requirements. It is understood that one or more of the SDN controllers 230-245 alone or in combination with other network and/or service assets, can determine an occurrence of an exceptional functional and/or resource requirements. In some embodiments, determination of the exceptional requirements can be based on a network status, a service requirement and/or a user equipment requirement. Alternatively or in addition, the exceptional requirement can be based at least in part on another entity, such as a third party entity. The third party entity can include, without limitation, an operation and maintenance service provider, an equipment and/or software vendor requirement—this can include networking equipment including any of the network devices disclosed herein, underlying hardware and/or software supporting the VNFs, end user equipment and the like. Still other third party entities can include, without limitation, service providers, governmental agencies, and so on.

For example, the manager SDN controller 230 can instantiated and/or decommission and/or reconfigure VNF elements 274A-276C. For example, in a streaming media application, such as a Netflix™ Video Delivery application, the manager SDN controller 230 can determine that network demands for the access SDN controller 235 and transport SDN controller 245 may be relatively large for a given set of communication devices 216, while the core SDN controller 240 demands for these communication devices 216 may be relatively normal. The manager SDN controller 230 can look at the available resources and capacities for the currently instantiated SDN controllers 235, 240, 245 that are support these communication devices 216. If the demands of the media streaming application exceed the available resources, then the manager SDN controller 230 can automatically address the issue by, for example, instantiating additional access SDN controller 235 and transport SDN controller 245 resources. However, if it is determined that exceeding the available resources is based on an exceptional condition, e.g., one that goes beyond the scope of routinely provisioned services of the default and/or dedicated slices 110, 112 (FIG. 1), requests can be initiated to instantiate, allocate or otherwise provide access to the super slice 260.

In at least some embodiments, more than one super slice 260 may exist. For example, super slices can be provisioned according to one or more of service application, scope, capacity, location, network conditions, business rules, policies, and the like. Accordingly, one or more of the controllers 230-245 and/or an SSF 134 and/or NSSF 128 can identify and/or otherwise initiate a provisioning of an appropriate super slice 160. This can include selecting a particular super slice 160 of a predetermined group of super slices 160. Although super slices 160 may be predetermined, they are not necessarily instantiated until an actual and/or perceived time of need. Alternatively or in addition, a super slice 160 can be identified or otherwise configured responsive to an actual and/or perceived time of need. In such scenarios, it is envisioned that a number and/or type of NVFs can be determined at the actual and/or perceived time of need. The particular super slice 260 can then be instantiated and/or identified for future instantiation based on the identification and/or configuration.

In one or more embodiments, the manager SDN controller 230 may determine that sufficient resources exist at the currently instantiated access SDN controller 235 and transport SDN controller 245 resources, however, the priorities of these resources need to be adjusted. For example, where a heavy streaming media loading is identified, the access SDN controller 235 and transport SDN controller 245 resources may be given higher priority in comparison to the core SDN controller 240. Conversely, if a heavy loading of Voice over IP (VoIP) services is identified, then the manager SDN controller 230 can automatically place the core network SDN controller 240 into higher priority in comparison to access network SDN controller 235 and transport network SDN controller 245.

In one or more embodiments, a SDN-controlled network, using network function virtualization, software defined networking, and/or cloud-based concepts, can provide flexibility in number, type and/or configuration of virtual networks, sometimes referred to as flexible network slicing. Network slicing facilitates distributed functionality, e.g., to support diverged types of services and requirements, such as those supporting future developments in wireless networks including 5G networks. SDN controllers 230 can provide control and configuration to support different network slices on appropriate network slices or clouds 262A-C by instantiating and controlling a proper sets of VNF elements 274A-276C and by the optimal distribution of these VNF elements 274A-276C based on application and service requirements.

Generally speaking, network slicing is a network management technique in which compute and/or connectivity resources in a communications network are divided to create a set of different virtual networks. For example, network slices can be supported by virtual network functions instantiated upon generic computing resources to provide specific network functions. Without limitation, network slices can be used in one or more of a core network, a radio access network, a backhaul network. Isolation provided by the network slices can be applied to different operators, different types of services, different types of network traffic, different users and/or classes of users, and the like.

In one or more embodiments, network slicing can be used by the SDN network to support multiple virtual networks behind the air interface(s) 217 of the communication network. The slicing of the network into multiple virtual networks can provide optimal support for different Radio Access Networks (RAN) and/or different service types running across a single RAN. Further, in one or more embodiments, flexible distribution of the access, edge, and core elements of the network cloud can provide optimal support regarding latency and/or service isolation for different apps and service requirements. Connectivity between computing resources can be allocated so that traffic of one slice can be isolated from that of another. Isolation can be based on one or more of network operator, service, application, user, user equipment, level of subscription service, and so on. By way of example, one slice can be configured to suit the needs of a Machine Type Communication (MTC) service, which typically generate large numbers of short transmissions that do not require ultra-reliable connections. Another slice can support Mobile Broadband (MBB), or enhanced Mobile Broadband (eMBB) services, having different requirements. Network slices created to serve the needs of different services may be built upon the resources allocated to a network operator within a slice that isolates the network operator from other network operators on a set of resources associated with a service provider.

In one or more embodiments, the SDN Network 250 can determine what service(s) is being used and which external network and/or network operator, e.g., by way of an Access Point Node (APN), is being used for the specific traffic. In one embodiment, the analysis can be performed by a SDN controller 230-245, which derive information either directly from communications entering the network 200 form one or more communication devices 216 or from a MGW 242 that is monitoring this type of traffic. In one or more embodiments, a SDN Controller 230 can perform analysis that determine a detailed granularity of the specific services being sought by or provided to the communication device 216. This detailed granularity can reveal sets of service functions (e.g., identifying servers, providing connections to applications, verifying authenticity, providing control plane and user plane functions) that are necessary for facilitating the delivery of services. The detailed granularity can also include determining various data pathways, within the network 200 and beyond, necessary for facilitating the delivery of services. The SDN Controller 230 can instantiate VNF elements 274A, 276A that can cause traffic to be sent to respective destinations such as 4G, 4G+, or 5G APNs, based upon breaking up the specific services requested into the types of service functions, resources, data accesses, and/or network data paths. The VNF elements that are composed, configured, and chained by the SDN Controller 230 for implementing the necessary service functions are, in turn, instantiated into the 5G network 200 in network locations that optimize one or more characteristics of the service functions and/or network data paths.

Examples of flexible, adaptive networks, such as the illustrative example communication network 200, are disclosed in commonly owned, U.S. patent application Ser. No. 15/344,692, entitled "Method and Apparatus for a Responsive Software Defined Network," filed on Nov. 7, 2016, and incorporated herein by reference in its entirety. Additionally, techniques related to dynamic network routing in a software defined network are disclosed in U.S. patent application Ser. No. 15/351,618, entitled "Method and Apparatus for Dynamic Network Routing in a Software Defined Network," filed on Nov. 15, 2016, and also incorporated herein by reference in its entirety.

Figure 3A:
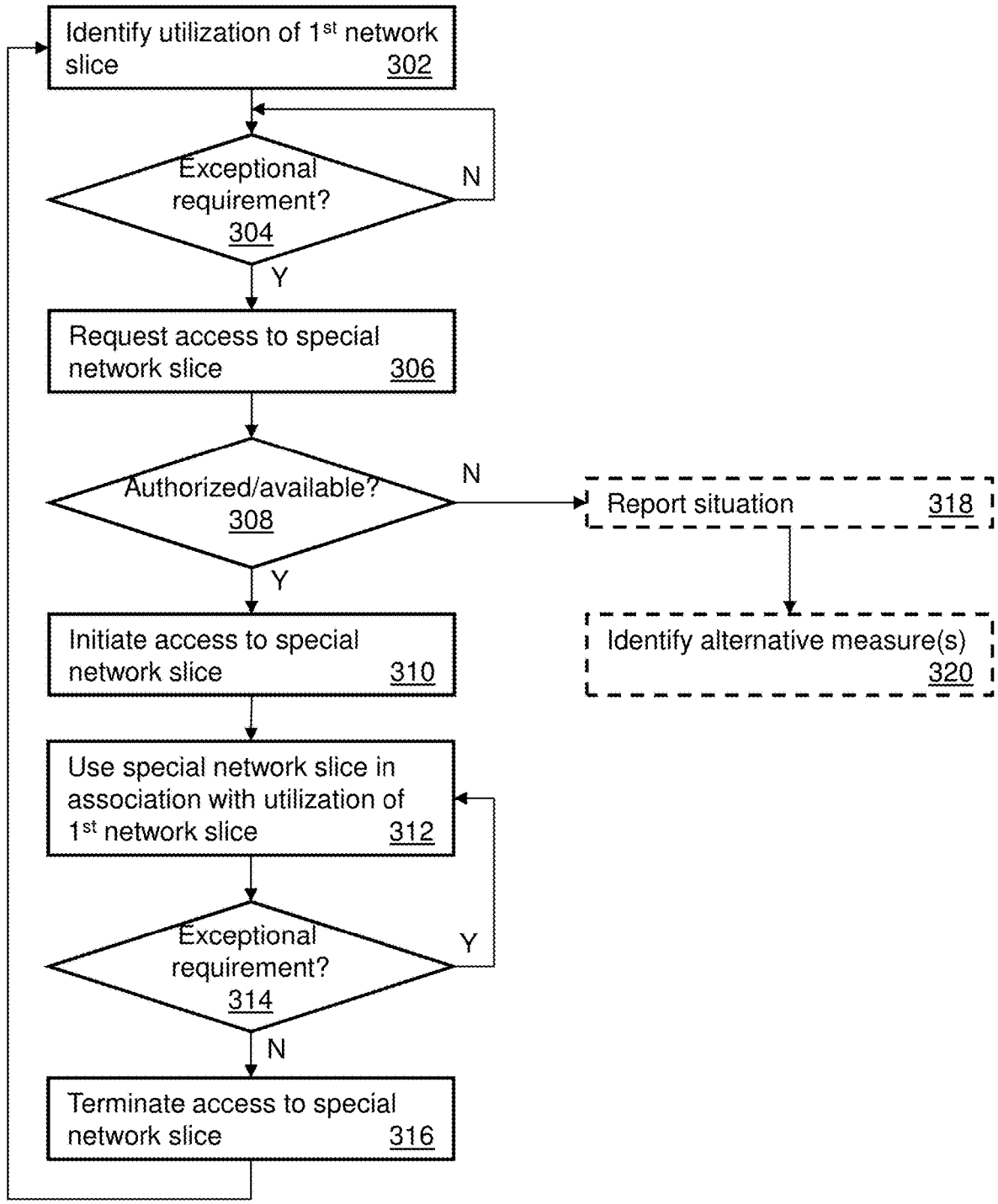
FIGS. 3A-3B depicts illustrative embodiments of processes for managing network resources used in portions of the system described in FIGS. 1 and 2.

FIG. 3A depicts illustrative embodiments of a process 300 for managing network resources used in portions of the system described in FIGS. 1 and 2. A determination is made at step 302 as to whether a request has been made to access a special network slice. In at least some embodiments, one or more default and/or dedicated slices are employed by equipment of a user at any given time. For example, a user may be streaming video to a smart phone, while engaging in an instant messaging discussion with a coworker, or browsing the Web. Accordingly, appropriate dedicated network slices, e.g., for streaming media, instant message, browsing and so on are initiated and used by associated functions to deliver the different services to the user device. In this scenario, one or more of the utilized network slice(s) are identified. Identification can be obtained from one or more of the mGW, an SDN controller, a NSSF, and the like.

A determination is made at step 304 as to whether an exceptional requirement exists. Exceptional requirements and/or conditions generally relate to circumstances during which any allocated network slices, e.g., those determined in step 302, are unable to reliably provide the corresponding services and/or functions. Exceptional requirements can be detected in any suitable manner. For example, resource requests from a particular premium function, service and/or service provider. Alternatively or in addition, the exceptional requirement can be determined according a location of equipment of the user, e.g., in a country or region that requires heightened security measures. Likewise, the exceptional requirement can be determined by a report and/or message from the network service provider, subscribed service provider, operation and maintenance provider, and/or a third party, such as an enterprise administrator, a network operator, a security monitor, a government agency, and the like.

To the extent that it is determined that an exceptional requirement exists, a request is made at step 306 to access a special network slice. Access to the special network slice can include a request to access a predetermined slice. The request can include an identity of the slice, e.g., as it may be associated with predetermined special slice requirements. In at least some instances, the request identifies a request for access to a special slice without necessarily identifying any particular special slice. For example, the request can include an identification of one or more of a service, a function, and/or a functional requirement associated with the identification of one or more of the first network slice at step 203 and/or the exceptional requirement at step 304.

In at least some embodiments, an association of one or more special slices and/or special slice requirements is maintained. This can be maintained by one or more of a network service provider, subscribed service provider, operation and maintenance provider, and/or a third party, such as an enterprise administrator, a network operator, a security monitor, a government agency, and the like. The association can be based on one or more of a predictive analysis of special slice requirements, e.g., NVFs to be accommodated by the special slice. Alternatively or in addition, the association can be based on one or more of a level of subscription, a user identity, an equipment type, a service type, a condition of the network, and the like.

To the extent that an exceptional requirement does not exist, the process continues from step 304, e.g., continuing to monitor for an occurrence of an exceptional requirement. For example, separate monitoring can occur for each identified network slice. Consider a situation in which user equipment 104 is accessing services by way of multiple dedicated slices 112 (FIG. 1). Each utilized slice can be identified, e.g., at step 302, and for each identified slices, the at least a portion of the process 300 can be repeated.

In response to the request to access the special network slice, a determination is made at step 308 as to whether the request is authorized and/or the special network is available. It is understood that in at least some instances, the process can include an additional step of identifying and/or otherwise defining and/or describing the special network slice. In some embodiments, it is envisioned that one or more special slices can be predetermined, e.g., based upon a determination of exceptional requirements beforehand. Based on the exceptional requirements, alone or in combination with a determination of dedicated slices, e.g., typical dedicated slices, the special network slices can be identified and/or otherwise described.

Authorization to access the special slice can be determined beforehand, e.g., at a time of subscription whereby a subscriber contracts for availability of special slices. In these instances, the authorization can be included in a service contract, e.g., a service level agreement. It is further understood that such authorization, whether contracted for or otherwise, may depend on one or more of an identity of the user, an identity and/or type of the user equipment, a type of service, a subscription level, and/or a priority of one or more of the user, the service, the function. In at least some embodiments, authorization can be subject to one or more of policies, business rules, network conditions, e.g., capacity, usage, and the like, alone or in combination with any of the foregoing.

To the extent that it is determined at step 308 that authorization is not obtained and/or the special network slice is not available, a report to that affect can be optionally prepared and/or requested at 318 (shown in phantom). In at least some embodiments, alternative measures and/or suggestions can be identified and/or otherwise provided optionally at 320 (also shown in phantom). Alternative measures can include, without limitation, a recommendation to try a different network, e.g., to move a user from a macro cell to a WiFi hotspot, providing access to alternative services in place of the special network slice. In some embodiments, the alternative measure may recommend and/or inform a requesting entity that the request should be re-submitted and/or queued for processing at a later time. Still further, it is envisioned that alternative measures can include an offer to modify an SLA, e.g., to provide enhanced and/or increased access to special network slice(s).

Alternatively or in addition, one or more of the special slices are identified responsive to the identification of one or more of the first network slice at step 302 and/or identification of the exceptional requirement at step 304. In at least some instances, parameters of the exceptional requirement, e.g., processing capacity, networking capacity, communication capacity, and the like are identified and usable.

To the extent it is determined at step 308, that the special network slice is available and access is authorized, access to the special network slice is initiated at 310. In some embodiments, access to the special network slice is provided in place of a dedicated network slice associated with the exceptional requirement. Alternatively or in addition, access to the special network slice is provided in combination with the dedicated network slice associated with the exceptional requirement. For example, the special slice can be linked, joined or otherwise chained with the dedicated slice and/or a default slice. Once access has been established, the special slice is accessed at step 312.

It is envisioned that in at least some embodiments, access to special slices should not be granted and/or authorized for duration longer than necessary to accommodate the exceptional requirement determined at 304. In this manner, excess network resource capacity provided by way of the special slice(s) is released when it is determined that it is no longer needed. Such release frees up network resources, e.g., by way of the special slice and/or underlying hardware and SDN resources associated with the special slice. Accordingly, it can be determined, e.g., at step 314, whether the exceptional requirement remains. In some embodiments, a continued status of the exceptional requirement can be determined in a manner similar to that used in association with step 304. Alternatively or in addition, other means can be used, e.g., by evaluating a system performance measure, e.g., a processing utilization, a memory utilization, a communication utilization, and so on. Such utilizations can be determined based on the special network slice, whereby resolution of the exceptional requirement is observable.

Alternatively or in addition, a determination as to persistence of the exceptional requirement at 314 can be determined according to one or more of a timer, a buffer depth, a message, e.g., a message and/or status reported by or in association with a service, a function and/or a communication device associated with the authorized access to the special slice.

To the extent that it determined that the exceptional requirement persists at step 314, the process continues to step 312, utilizing the special network slice as described above. To the extent that is determined that the exceptional requirement no longer persists at 314, the process continues to step 316, at which access to the special network slice can be terminated. Termination can include any efficient manner, e.g., by initiating a request to one or more of the mGW, the SDN controller and/or orchestrator, to terminate access. In at least some embodiments, termination of access to the network slice is accompanied by resolution of utilization of the original first network slice, e.g., at step 302 and/or an equivalent slice.

Figure 3B:
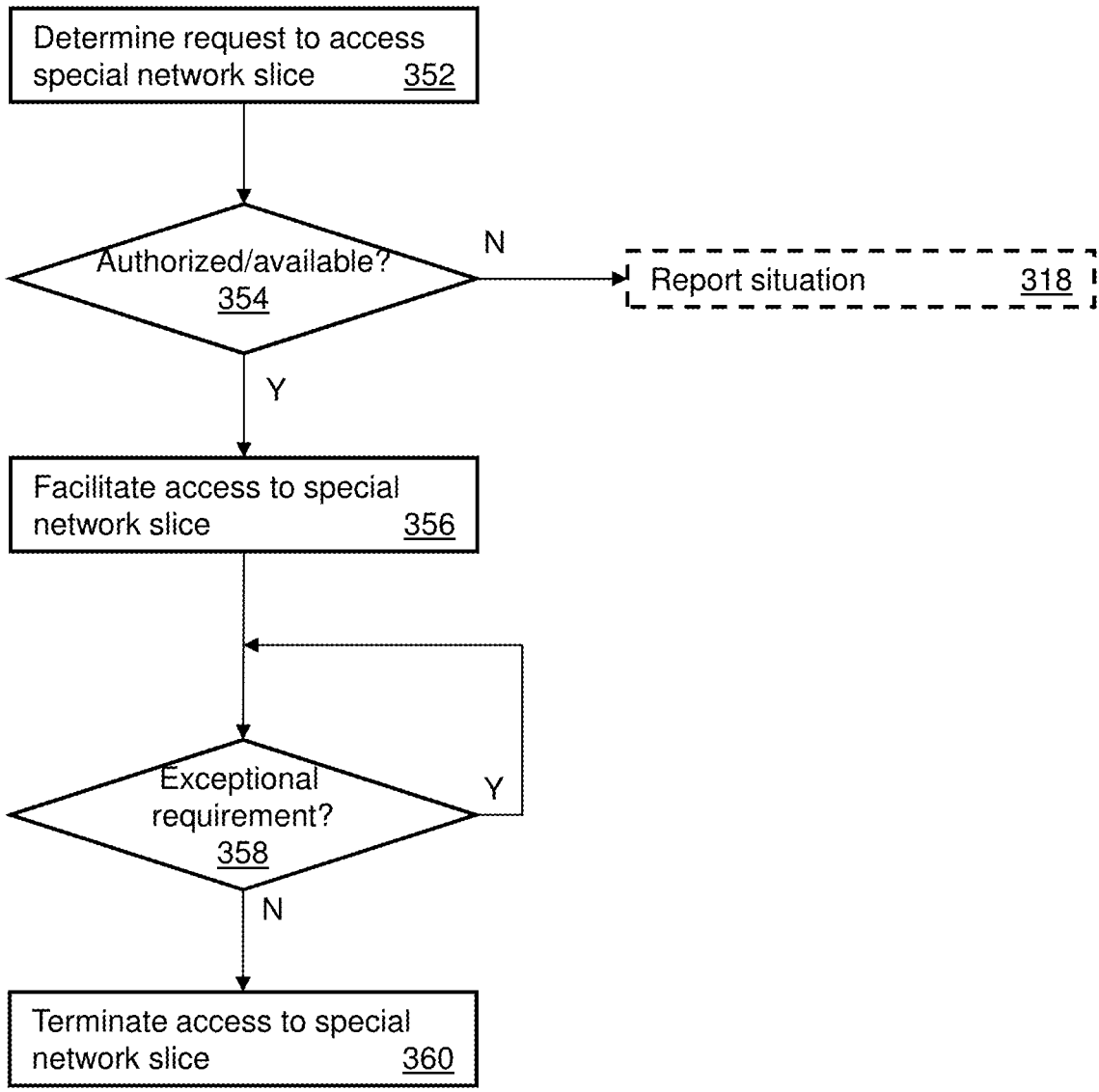

FIG. 3B depicts another illustrative embodiments of a process 350 for managing network resources used in portions of the system described in FIGS. 1 and 2. The process 350 includes determining a request to access a special network slice at 352. A determination is made at step 354 as to whether the requested special network slice is available and/or authorized. In at least some embodiments, failure of availability and/or authorization to the special network slices at step 354 can be reported at step 318 (shown in phantom). To the extent that the requested special network slice is available and/or authorized, access to the special network slice is facilitated at 356. The process 350 monitors whether the exceptional requirement persists at 358. To the extent it no longer exists, the process terminates access to the special network slice at 360.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
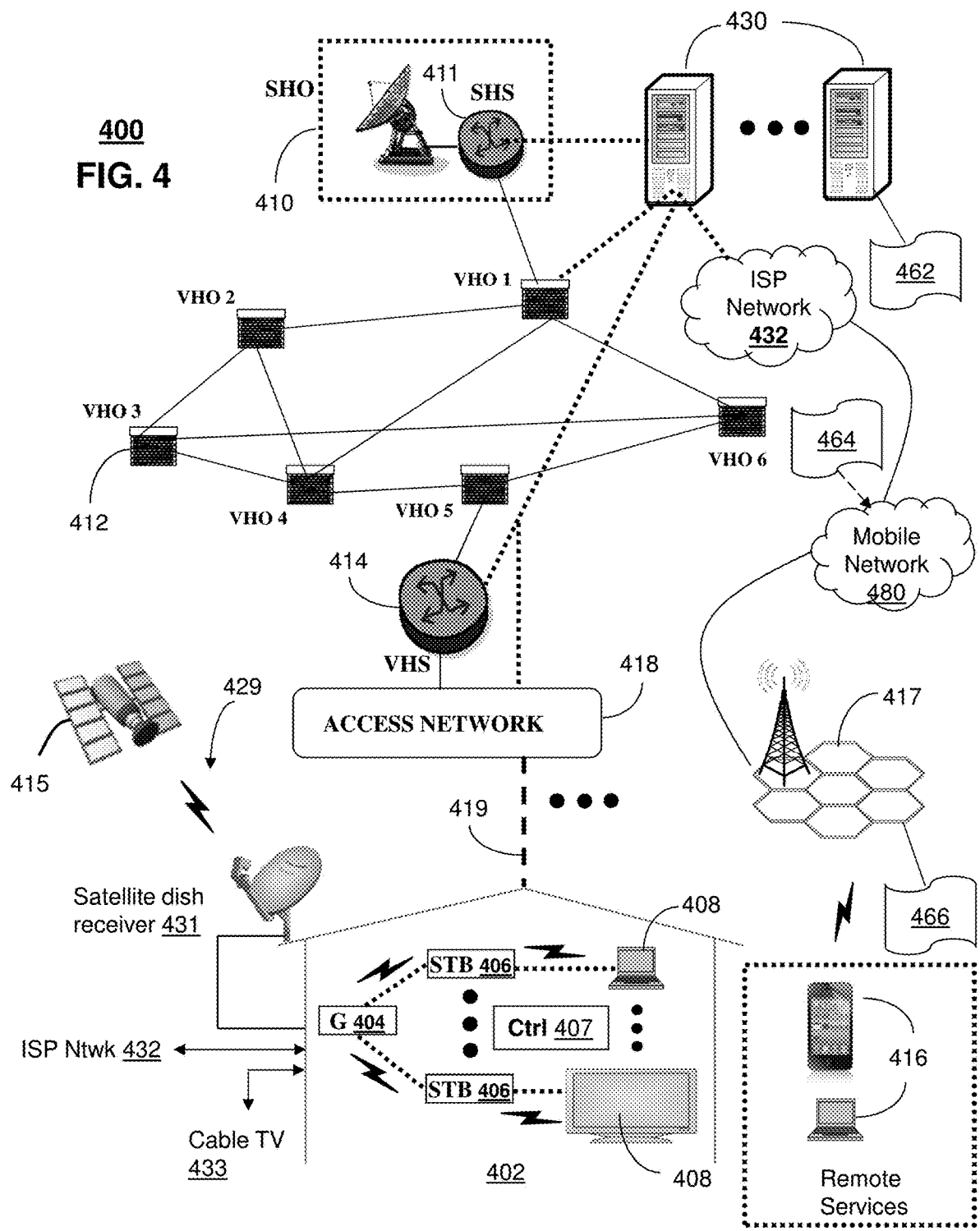
FIGS. 4-5 depict illustrative embodiments of communication systems that provide media services that can be used by the communication networks of FIGS. 1-2.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with one or more of the communication systems 100, 200 of FIGS. 1 and/or 2, as another representative embodiment of communication system 400. For instance, one or more devices illustrated in the communication system 400 of FIG. 4, can facilitate determination of a first group of virtual network functions instantiated within a software defined network, e.g., default slices 112 (FIG. 1) and adapted to perform a first activity that facilitates delivery of a dedicated service to wireless equipment of a first user under normal conditions. One or more of the devices of the communication system 400 can determine an occurrence of an exceptional condition, whereby delivery of the dedicated service to the wireless equipment requires a second activity that first group of virtual network functions is not designated to perform the second activity. In at least some embodiments, the first group of virtual network functions is incapable of performing the second activity. Access to a second group of virtual network functions is facilitated, responsive to the determining of the occurrence of the condition. The second group of virtual network functions when instantiated within the software defined network are adapted to perform the second activity that facilitates delivery of the dedicated service to the wireless equipment of the first user during the occurrence of the condition.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

The communication system 400 can also provide for all or a portion of the computing devices 430 to function as a network slice selection function (herein referred to as NSSF 430). The NSSF 430 can use computing and communication technology to perform function 462, which can include among other things, the slice selection techniques described by processes 300, 350 of FIGS. 3A-3B. For instance, function 462 of server 430 can be similar to the functions described for the NSSF 128 of FIG. 1 in accordance with the processes 300, 350 of FIGS. 3A-3B. The mobile network core 480 and/or the cell site 417 can be provisioned with software functions 464 and 466, respectively, to utilize the services of the NSSF 430. For instance, functions 464 and 466 can be similar to the functions described for NSSF 128 of FIG. 1 in accordance with the processes 300, 350 of FIGS. 3A-3B.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
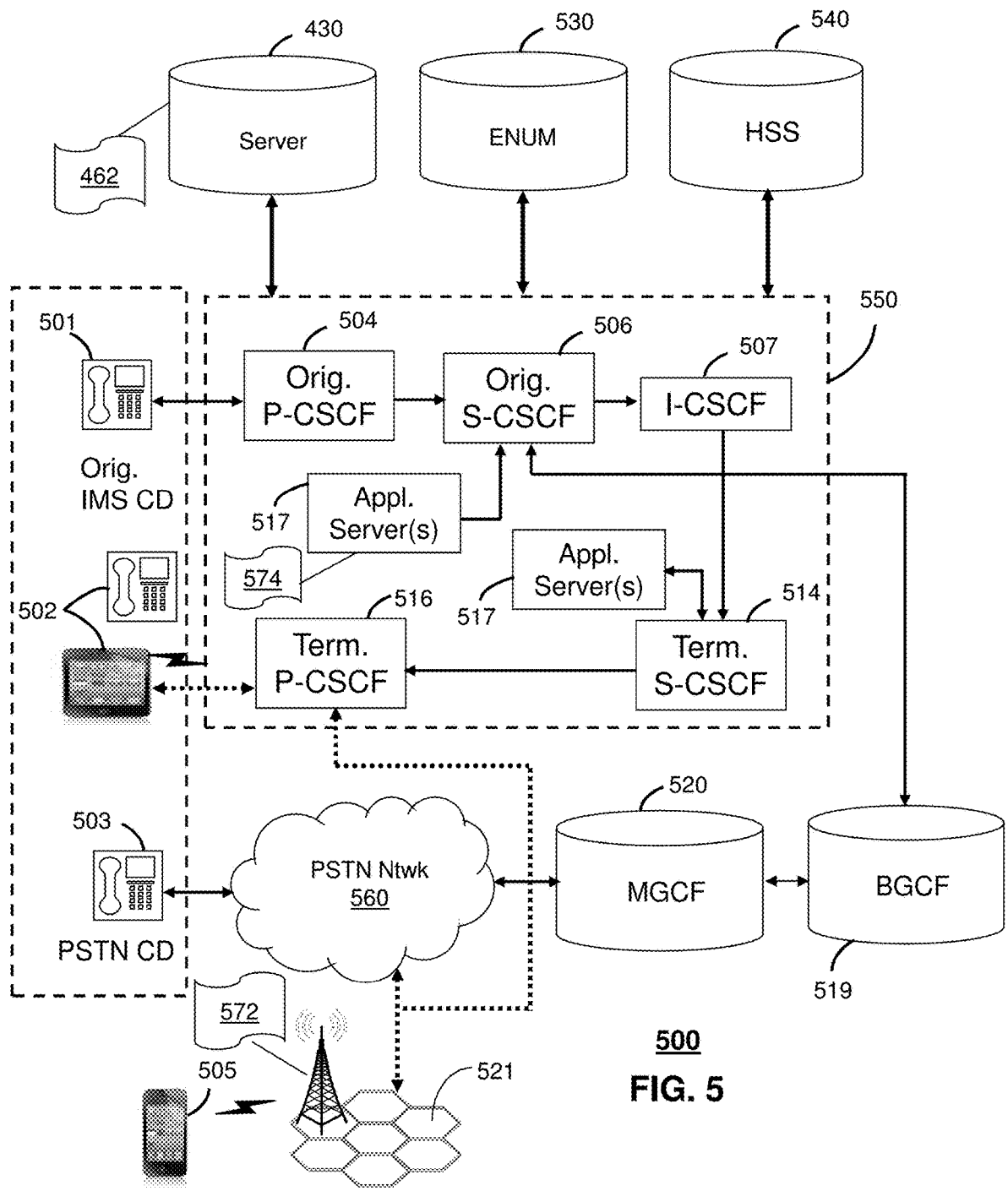

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with communication systems 100, 200 of FIGS. 1 and/or 2 and communication system 400 as another representative embodiment of communication system 400. One or more of the devices of the communication system 500 can facilitate determination of a first group of virtual network functions instantiated within a software defined network, e.g., default slices 112 (FIG. 1) and adapted to perform a first activity that facilitates delivery of a dedicated service to wireless equipment of a first user under normal conditions. One or more of the devices of the communication system 400 can determine an occurrence of an exceptional condition, whereby delivery of the dedicated service to the wireless equipment requires a second activity that first group of virtual network functions is not designated to perform the second activity. Access to a second group of virtual network functions is facilitated, responsive to the determining of the occurrence of the condition. The second group of virtual network functions when instantiated within the software defined network are adapted to perform the second activity that facilitates delivery of the dedicated service to the wireless equipment of the first user during the occurrence of the condition.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The NSSF 430 of FIG. 4 can be operably coupled to communication system 500 for purposes similar to those described above. The NSSF 430 can perform function 462 and thereby provide super-slice access services to the CDs 501, 502, 503 and 505 of FIG. 5 similar to the functions described for the NSSF 128 of FIG. 1 in accordance with processes 300, 350 of FIGS. 3A-3B. The mobile network 521, which can be adapted with software to perform function 572 to utilize the services of the NSSF 430, similar to the functions described for mobile core network 480 and/or cell site 417 of FIG. 4 in accordance with processes 300, 350 of FIGS. 3A-3B. The NSSF 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
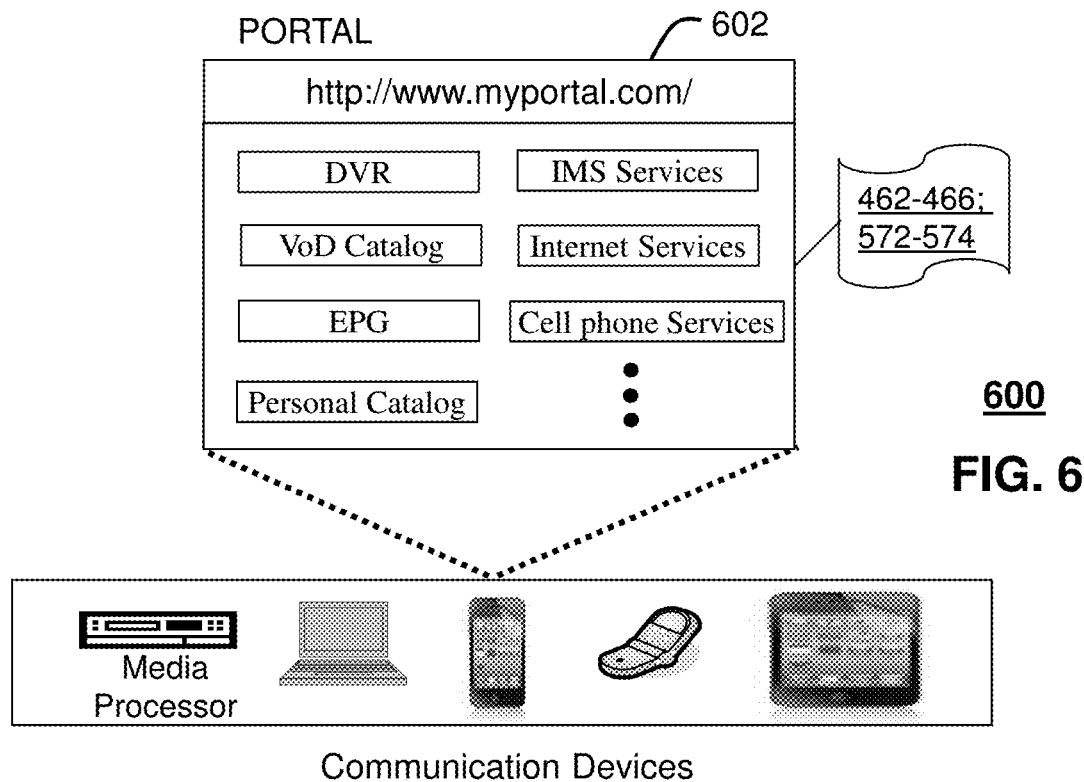
FIG. 6 depicts an illustrative embodiment of a web portal for interacting with the communication systems of FIGS. 1-2, and 4-5.

FIG. 6 depicts an illustrative embodiment of a web portal 602 of a communication system 600. Communication system 600 can be overlaid or operably coupled with communication systems 100, 200 of FIGS. 1 and/or 2, communication system 400, and/or communication system 500 as another representative embodiment of communication systems 100, 200 of FIGS. 1 and/or 2, communication system 400, and/or communication system 500. The web portal 602 can be used for managing services of the communication systems 100, 200 of FIGS. 1 and/or 2 and communication systems 400-500. A web page of the web portal 602 can be accessed by a Uniform Resource Locator (URL) with an Internet browser using an Internet-capable communication device such as those described in FIGS. 1 and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of communication systems 100, 200 of FIGS. 1 and/or 2, and communication systems 400-500. For instance, users of the services provided by the default slice 110, the premium service 106, and/or the NSSF 128 can log into their on-line accounts and provision the servers 110 or server 430 with subscription levers, equipment types, business rules, policies, authorization and/or access parameters and/or requirements, and so on. Network operators, service providers, and/or other third parties, can log onto an administrator account to provision, monitor and/or maintain at least respective portions of the communication systems 100, 200 of FIGS. 1 and/or 2 and/or the NSSF 430.

Figure 7:
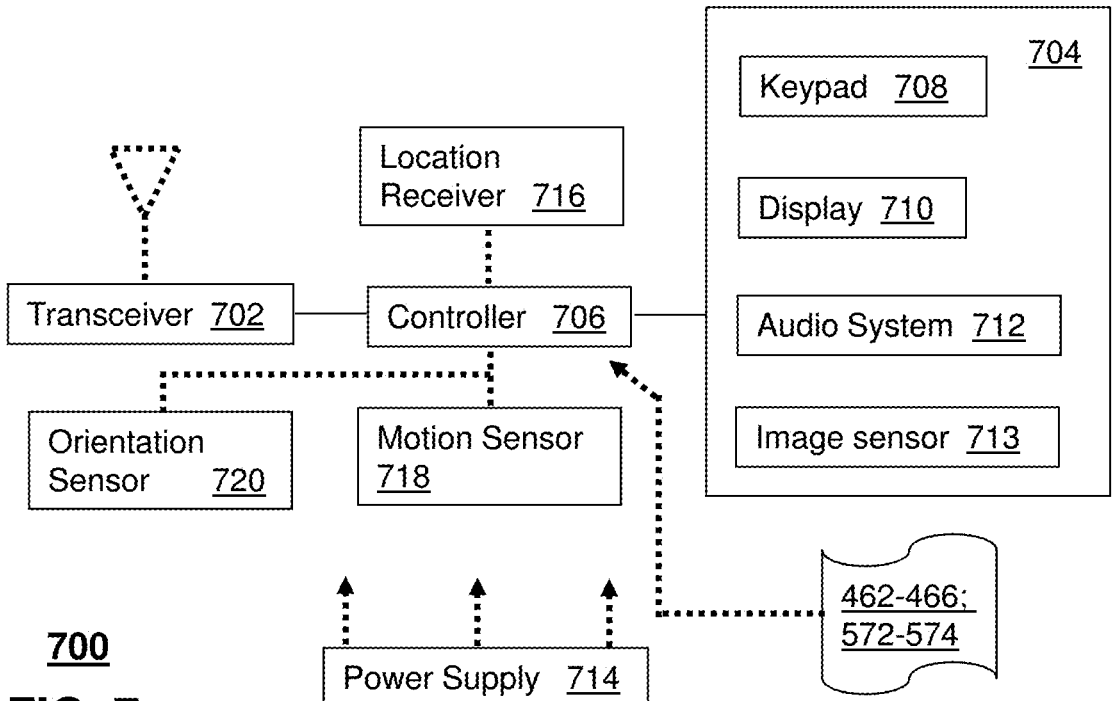
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIGS. 4-5 and can be configured to perform portions of the processes 300, 350 of FIGS. 3A-3B.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the user equipment 104 of FIG. 1 and/or the mobile communication devices 216 of FIG. 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in the communication systems 100, 200 of FIGS. 1 and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, it is understood that in at least some instances, the super slice 140 can serve the requesting premium service without necessarily utilizing the requesting dedicated slice 112, or even any of the dedicated slices 112. For example, the super slice 140 can assume the role of a dedicated slice 112 for at least a duration of the exceptional condition. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
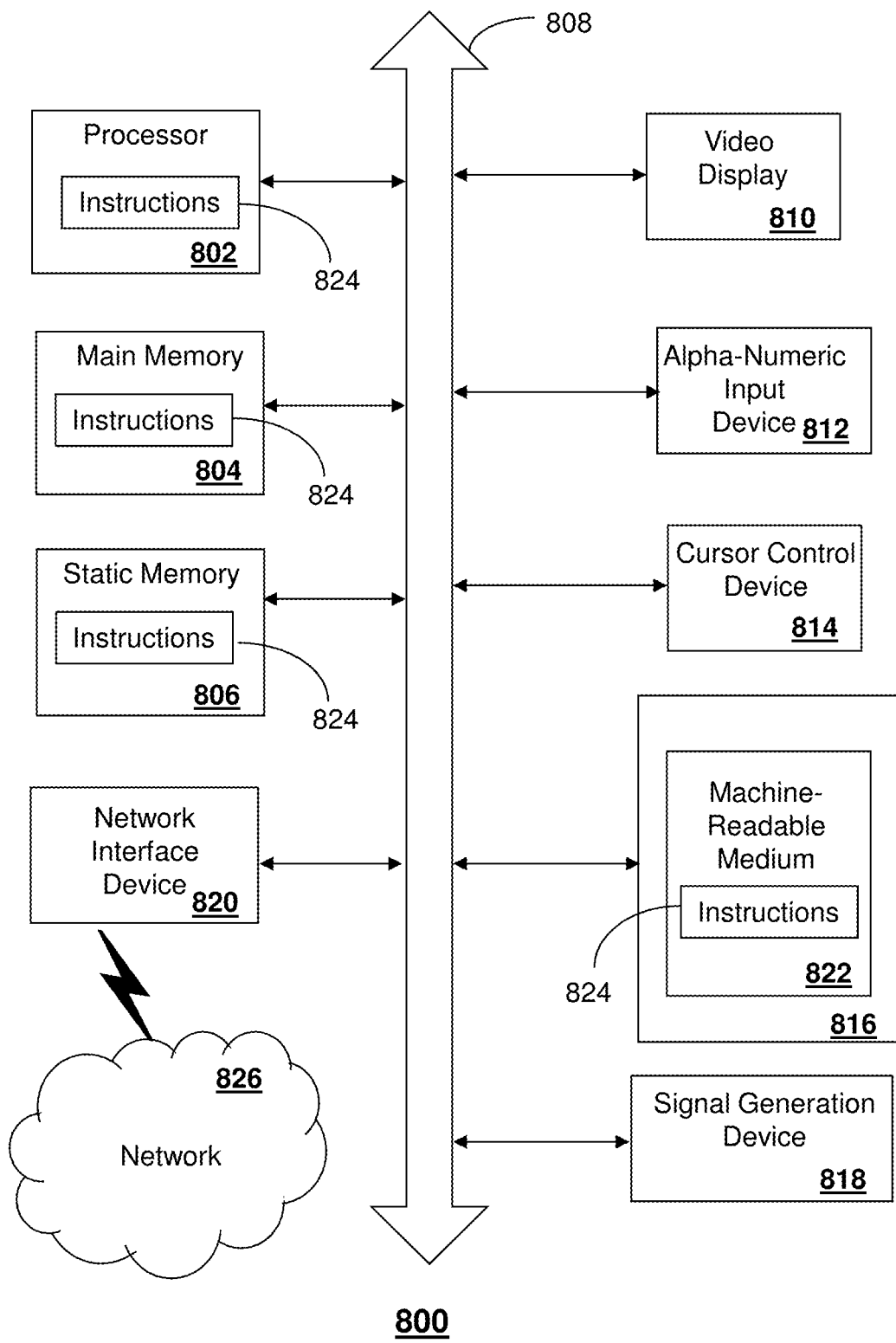
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the NSSF 430, the media processor 406 the mGW 132, the SSF 134, the dedicated slices 112, functional modules of the dedicated slices 120, 122, 124, 128, the premium function module 114, authentication function modules 142, and other devices of FIGS. 1-2 and 4-5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, comprising:
   identifying a first group of virtual network functions of a first network slice instantiated within a software defined network and adapted to perform a first activity that facilitates delivery of a service to wireless equipment of a first user;
   detecting an occurrence of a condition; and facilitating, responsive to the detecting of the occurrence of the condition, access to a second group of virtual network functions, wherein the second group of virtual network functions when instantiated within a second network slice of the software defined network are configured to deliver the service to the wireless equipment of the first user during the occurrence of the condition within the first network slice, wherein the second network slice is further adapted to perform another activity that facilitates delivery of another service during an occurrence of another condition within another network slice.

2. The device of claim 1, wherein the first network slice comprises a dedicated network slice of a $3^{rd}$ Generation Partnership Project (3GPP) 5G network reserved to facilitate delivery of the service to the wireless equipment of the first user, wherein the dedicated network slice includes the first group of virtual network functions and excludes a virtual network function of the second group of virtual network functions.

3. The device of claim 2, wherein the first network slice comprises a reserved network slice of the 3GPP 5G network that is not reserved in association with equipment of any user.

4. The device of claim 1, wherein the detecting of the occurrence of the condition further comprises determining that excess capacity is required beyond a capacity of the first group of virtual network functions.

5. The device of claim 4, wherein the second network slice of the software defined network is adapted to perform another activity that facilitates delivery of the service, wherein the first group of virtual network functions is incapable of performing the other activity, and wherein the excess capacity comprises one of excess processing capacity, excess storage capacity, excess communication capacity, and any combination thereof.

6. The device of claim 1, wherein the facilitating of the access to the second group of virtual network functions further comprises identifying, responsive to the detecting of the occurrence of the condition, a reserved network slice comprising the second group of virtual network functions, wherein access to the reserved network slice is not dedicated to equipment of any user.

7. The device of claim 6, wherein the facilitating of the access to the second group of virtual network functions further comprises initiating, responsive to the detecting of the occurrence of the condition, a request to temporarily access the reserved network slice.

8. A method, comprising:
determining, by a processing system including a processor, a first group of virtual network functions of a first network slice instantiated within a software defined network and adapted to perform a first activity that facilitates delivery of a service to wireless equipment of a first user;
detecting, by the processing system, an occurrence of a condition; and
facilitating, by the processing system and responsive to the determining of the occurrence of the condition within the first network slice, access to a second group of virtual network functions, wherein the second group of virtual network functions, when instantiated within a second network slice of the software defined network, are configured to deliver the service to the wireless equipment of the first user during the occurrence of the condition within the first network slice, wherein the second network slice is further adapted to perform another activity that facilitates delivery of another service during an occurrence of another condition within another network slice.

9. The method of claim 8, wherein the first network slice comprises a dedicated network slice of a $3^{rd}$ Generation Partnership Project (3GPP) 5G network reserved to facilitate delivery of the service to the wireless equipment of the first user, wherein the dedicated network slice includes the first group of virtual network functions and excludes a virtual network function of the second group of virtual network functions.

10. The method of claim 9, wherein the first network slice comprises a reserved network slice of the 3GPP 5G network that is not reserved in association with equipment of any user.

11. The method of claim 8, wherein the determining of the occurrence of the condition further comprises determining, by the processing system, that excess capacity is required beyond a capacity of the first group of virtual network functions.

12. The method of claim 11, wherein the excess capacity comprises one of excess processing capacity, excess storage capacity, excess communication capacity, and any combination thereof.

13. The method of claim 8, wherein the facilitating of the access to the second group of virtual network functions further comprises identifying, by the processing system and responsive to the determining of the occurrence of the condition, a reserved network slice comprising the second group of virtual network functions, wherein access to the reserved network slice is not dedicated to equipment of any user.

14. The method of claim 13, wherein the facilitating of the access to the second group of virtual network functions further comprises initiating, by the processing system and responsive to the determining of the occurrence of the condition, a request to temporarily access the reserved network slice.

15. A non-transitory, machine-readable medium, comprising executable instructions that, when executed by a processing system including a processor, facilitate performance of operations, comprising:
determining a first group of virtual network functions of a first network slice instantiated within a software defined network and adapted to perform a first activity that facilitates delivery of a service to wireless equipment of a first user;
determining an occurrence of a condition; and
facilitating, responsive to the determining of the occurrence of the condition within the first network slice, access to a second group of virtual network functions of a second network slice, wherein the second group of virtual network functions when instantiated within the software defined network are configured to deliver the service to the wireless equipment of the first user during the occurrence of the condition within the first network slice, wherein the second network slice is further adapted to perform another activity that facilitates delivery of another service during an occurrence of another condition within another network slice.

16. The non-transitory, machine-readable medium of claim 15, wherein the first network slice comprises a dedicated network slice of a $3^{rd}$ Generation Partnership Project (3GPP) 5G network reserved to facilitate delivery of the service to the wireless equipment of the first user, wherein the dedicated network slice includes the first group of virtual network functions and excludes a virtual network function of the second group of virtual network functions.

17. The non-transitory, machine-readable medium of claim 16, wherein the first network slice comprises a reserved network slice of the 3GPP 5G network that is not reserved in association with equipment of any user.

18. The non-transitory, machine-readable medium of claim 15, wherein the determining of the occurrence of the condition further comprises determining, by the processing system, that excess capacity is required beyond a capacity of the first group of virtual network functions.

19. The non-transitory, machine-readable medium of claim 18, wherein the excess capacity comprises one of excess processing capacity, excess storage capacity, excess communication capacity, and any combination thereof.

20. The non-transitory, machine-readable medium of claim 15, wherein the facilitating of the access to the second group of virtual network functions further comprises identifying, by the processing system and responsive to the determining of the condition, a reserved network slice comprising the second group of virtual network functions, wherein access to the reserved network slice is not dedicated to equipment of any user.

* * * * *